US010050464B2

(12) United States Patent
Hsieh

(10) Patent No.: US 10,050,464 B2
(45) Date of Patent: Aug. 14, 2018

(54) CORE CONTACTLESS LLC CHARGER AND CONTROLLING METHOD THEREOF

(71) Applicant: Amicord Corp., Taipei (TW)

(72) Inventor: Hung-I Hsieh, Chiayi (TW)

(73) Assignee: AMICORD CORP., Taipei (TW)

( * ) Notice: Subject to any disclaimer, the term of this patent is extended or adjusted under 35 U.S.C. 154(b) by 228 days.

(21) Appl. No.: 15/070,688

(22) Filed: Mar. 15, 2016

(65) Prior Publication Data

US 2017/0077737 A1    Mar. 16, 2017

(30) Foreign Application Priority Data

Sep. 15, 2015   (TW) .............................. 104130489 A

(51) Int. Cl.
| | |
|---|---|
| *H02J 7/00* | (2006.01) |
| *H02J 50/12* | (2016.01) |
| *H02M 3/00* | (2006.01) |
| *H02J 7/02* | (2016.01) |
| *H02M 3/28* | (2006.01) |
| *H02M 3/335* | (2006.01) |
| *H02M 3/337* | (2006.01) |
| *H02M 1/00* | (2006.01) |

(52) U.S. Cl.
CPC .............. *H02J 7/025* (2013.01); *H02J 50/12* (2016.02); *H02M 3/285* (2013.01); *H02M 3/335* (2013.01); *H02M 3/337* (2013.01); *H02M 2001/0058* (2013.01); *H02M 2001/0074* (2013.01); *Y02B 70/1433* (2013.01); *Y02B 70/1491* (2013.01)

(58) Field of Classification Search
CPC .......... H02J 7/025; H02J 50/12; H02M 3/285; H02M 3/335; H02M 3/337; H02M 2001/0058; H02M 2001/0074; Y02B 70/1433; Y02B 70/1491
USPC .................... 320/108, 104, 112, 135, 160
See application file for complete search history.

(56) References Cited

U.S. PATENT DOCUMENTS

| | | | | |
|---|---|---|---|---|
| 4,978,906 | A * | 12/1990 | Herbert ............... | G11C 19/085 323/361 |
| 9,762,293 | B2 * | 9/2017 | Bae ...................... | H04B 5/0037 |
| 9,847,670 | B2 * | 12/2017 | Moshfeghi ............. | H02J 7/025 |
| 9,882,413 | B2 * | 1/2018 | Jeong .................... | H02J 7/025 |
| 2003/0006633 | A1 * | 1/2003 | Clothier ................. | A47C 1/12 297/180.12 |
| 2004/0232899 | A1 * | 11/2004 | Herbert ............... | H02M 3/1584 323/282 |

(Continued)

FOREIGN PATENT DOCUMENTS

WO    WO 2008002164 A1 *    1/2008   ............. H02J 5/005

OTHER PUBLICATIONS

Hung-I Hsieh et al., "An Inductive Wireless Charger for Electric Vehicle by using LLC Resonance with Matrix Ferrite Core Group," IEEE Applied Power Electronics Conference and Exposition 2015, pp. 1637-1643. (7 pgs.) , Mar. 15-19, 2015.

*Primary Examiner* — Phallaka Kik
(74) *Attorney, Agent, or Firm* — Haynes and Boone, LLP

(57) ABSTRACT

The configurations of LLC charger and controlling methods thereof are provided. The proposed charger includes a transmitter-receiver (TX-RX) transformer including a TX-matrix core set (TX-MCS) and an RX-MCS, an LLC power stage electrically connected to the TX-MCS, and a rectifier electrically connected to the RX-MCS so as to charge a battery pack with a non-contact power transmission.

18 Claims, 23 Drawing Sheets

(56) References Cited

U.S. PATENT DOCUMENTS

| | | | |
|---|---|---|---|
| 2006/0187684 A1* | 8/2006 | Chandrasekaran | H02M 3/33592 363/16 |
| 2006/0243723 A1* | 11/2006 | Cornec | H02M 7/53803 219/660 |
| 2010/0270970 A1* | 10/2010 | Toya | H02J 7/0027 320/108 |
| 2010/0328044 A1* | 12/2010 | Waffenschmidt | H02J 7/025 340/10.4 |
| 2011/0156640 A1* | 6/2011 | Moshfeghi | H02J 7/025 320/108 |
| 2011/0211380 A1* | 9/2011 | Brown | H02M 3/33561 363/131 |
| 2011/0289924 A1* | 12/2011 | Pietsch | F28D 20/0056 60/682 |
| 2013/0005251 A1* | 1/2013 | Soar | B60N 2/4876 455/41.1 |
| 2013/0300204 A1* | 11/2013 | Partovi | H01F 38/14 307/104 |
| 2014/0091640 A1* | 4/2014 | Scholz | H01F 38/14 307/104 |
| 2014/0225454 A1* | 8/2014 | Ichikawa | B60L 11/182 307/104 |
| 2015/0236526 A1* | 8/2015 | Jadidian | H02J 5/005 320/108 |
| 2015/0300989 A1* | 10/2015 | Masleid | G01N 27/83 324/207.17 |
| 2016/0012967 A1* | 1/2016 | Kurs | H02J 50/12 307/104 |
| 2016/0056664 A1* | 2/2016 | Partovi | H02J 7/025 307/104 |
| 2016/0111887 A1* | 4/2016 | Jeong | H04B 5/0037 307/104 |
| 2016/0149442 A1* | 5/2016 | Asanuma | H02J 50/60 307/104 |
| 2016/0172890 A1* | 6/2016 | Jeong | H02J 7/04 320/108 |
| 2016/0372980 A1* | 12/2016 | Lannoije | H02J 17/00 |

* cited by examiner

CORE CONTACTLESS LLC CHARGER AND CONTROLLING METHOD THEREOF

CROSS-REFERENCE TO RELATED APPLICATION

The application claims the benefit of Taiwan Patent Application No. 104130489, filed on Sep. 15, 2015, in the Taiwan Intellectual Property Office, the disclosure of which is incorporated herein in its entirety by reference.

FIELD OF THE INVENTION

The present invention relates to an LLC charger and controlling method thereof. In particular, it relates to a core contactless LLC charger including a removable and separable matrix core set (MCS) and controlling method thereof.

BACKGROUND OF THE INVENTION

Magnetic-inductive power transfer (MIPT) and wireless power transfer (WPT) are modern contactless ways to transfer power particularly for use in electric vehicles. Either MIPT or WPT that uses series or parallel resonance with both-side resonances for power transfer might decrease the transfer effectiveness quickly if the converter operates outside of the resonant frequency.

Thus, how to avoid the drawbacks above is worthy of further research and improvement.

Keeping the drawbacks of the prior art in mind, and persistently employing experiments and research, the applicant has finally conceived a core contactless LLC charger and a controlling method thereof.

SUMMARY OF THE INVENTION

It is a primary objective of the present invention to disclose an LLC charger including a transmitter-receiver (TX-RX) transformer having a removable and separable matrix core set (MCS) and a controlling method thereof, and the goal of the MCS in the TX-RX transformer is to relatively increase a resonant magnetic-induction coupling (RMIC) area and relatively decrease a core loss.

According to the first aspect of the present invention, an LLC charger comprises a transmitter-receiver (TX-RX) transformer including a movable matrix core set (MCS), wherein the MCS separably includes a transmitter-MCS (TX-MCS) and a receiver-MCS (RX-MCS), and charges a battery pack with a non-contact power transmission via a resonant magnetic-induction coupling (RMIC) between the TX-MCS and the RX-MCS, a transmitter including an LLC power stage, and the TX-MCS electrically connected to the LLC power stage, a receiver including the RX-MCS, and a rectifier electrically connected to the RX-MCS.

According to the second aspect of the present invention, a charger comprises a transmitter-receiver (TX-RX) transformer including a TX-matrix core set (TX-MCS) and an RX-MCS, an LLC power stage electrically connected to the TX-MCS and a rectifier electrically connected to the RX-MCS so as to charge a battery pack with a non-contact power transmission.

According to the third aspect of the present invention, a transmitter-receiver (TX-RX) transformer comprises a matrix core set (MCS), wherein the MCS includes a TX-MC and an RX-MCS generating a resonant magnetic-induction coupling (RMIC) with the TX-MCS so as to output a contactless power.

The present invention can be best understood through the following descriptions with reference to the accompanying drawings, in which:

DETAILED DESCRIPTION OF THE PREFERRED EMBODIMENT

Figure 1A:
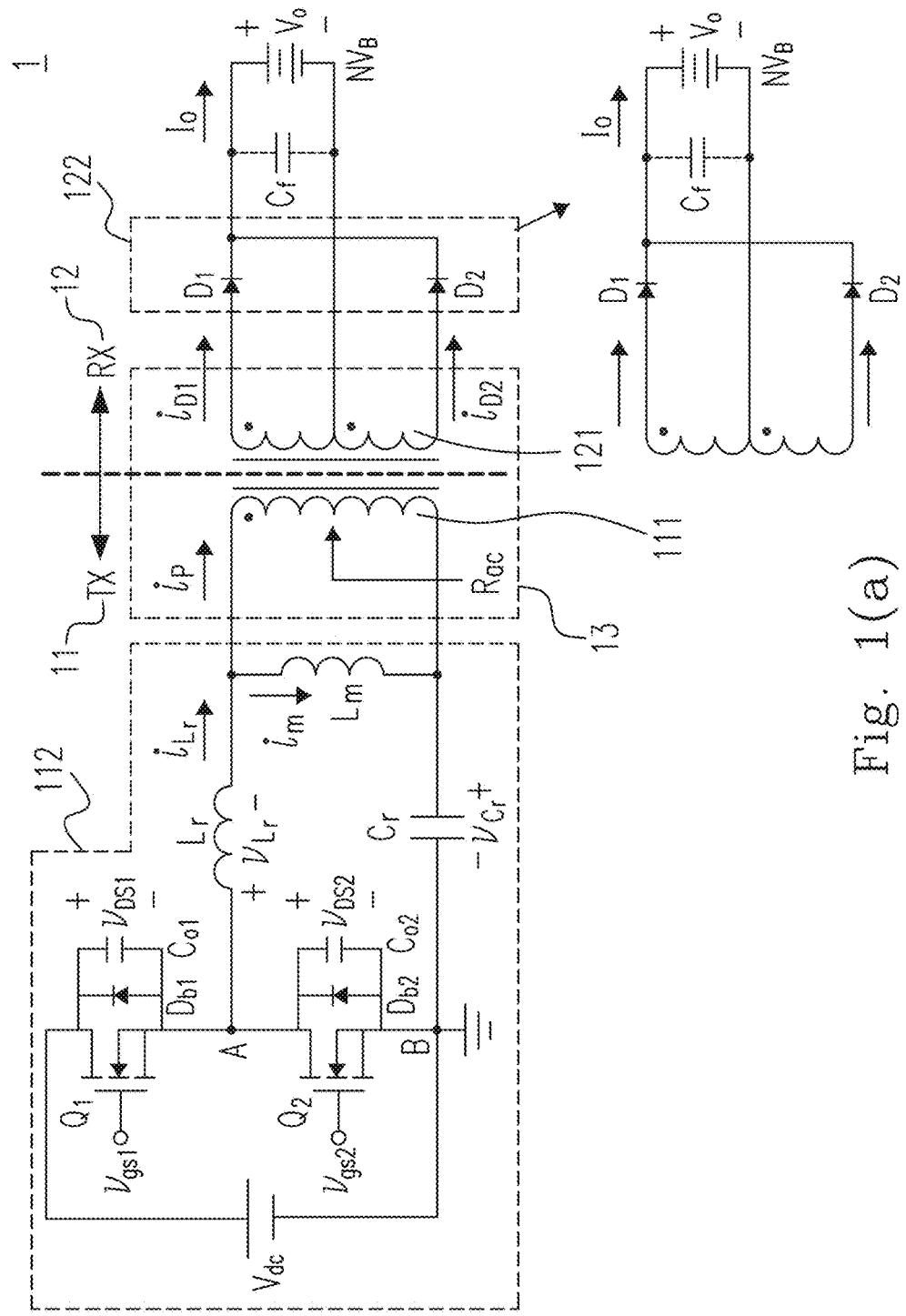
FIG. 1(a) shows a schematic circuit diagram of an LLC charger according to the first preferred embodiment of the present invention.

Although the following description contains many specifications for the purposes of illustration, anyone of ordinary skill in the art will appreciate that many variations and alterations to the following details are within the scope of the invention. Accordingly, the following preferred embodiment of the invention is set forth without any loss of generality to and without imposing limitations upon, the claimed invention.

The LLC charger belongs to Level-1 charger (charging power classified below 1.8 kW). The present invention propose a movable and separable matrix core set (MCS), this MCS includes a transmitter MCS (TX-MCS) and a receiver MCS (RX-MCS), these two MCSs combine together to form a TX-RX transformer to be a transformer of the LLC charger. The LLC charger charges a battery pack with a non-contact power transmission via a resonant magnetic-induction coupling (RMIC) between the TX-MCS and the RX-MCS. The MCS of this TX-RX transformer can be manufactured by using usual low cost ferrite cores, for example, an EE core, an EER core and a PQ core. All the ferrite core structures, which can be arranged in matrix, and can achieve the RMIC, not limited to the configurations shown in the preferred embodiments of the present invention formed, are all included in the scope of the present invention. The purpose of using the MCS as the transformer of the LLC charger is to increase the magnetic induction area and reduce the core loss.

This removable and separable TX-RX transformer is quite suitable to be used as the transformer of the LLC charger. The TX-MCS used as the primary side of the transformer of the LLC circuit and the LLC main circuit is configured on a fixed position or a non-fixed position (determined by the convenience considerations and the specific requirements). The RX-MCS used as the secondary side of the transformer is combined with a simple rectifying circuit and configured on a movable vehicle-mounted system such as a vehicle, a self-propelled robot, an emergency medical care vehicle, and a wheel chair. When the vehicle-mounted system requires to be charged, it will move to the place of the transmitting device of the LLC charger, the RX-MCS of the receiver and the TX-MCS of the transmitter are aligned automatically, and engage in charging via the RMIC.

The advantages of LLC charger using the RMIC are that the charging via RMIC only requires a primary side resonance, and a secondary side resonance is not required to engage in the non-contact power transmission and to charge the battery pack, the receiver on the vehicle-mounted system only has the RX-MCS and the rectifier because the LLC charger can adapt the battery pack into the resonant tank, that is the inner resistance of the battery pack will be reflected to the TX-MCS, corresponding to the primary side of the TX-RX transformer, to become a portion of the resonant element. Furthermore, a parasite capacitance and a leakage inductance generated due to a deviation to a parking position or an installation position can be totally absorbed into the resonant tank by the LLC charger such that the charging current does not have a noise interference. In addition, even if the deviance is generated, the LLC charger can continuously transmit a power due to the LLC charger has a wide frequency response capability, and although the charging capability will be decreased, the charging will not be interrupted.

The windings of the plural (e.g., k) sub-TX cores of the TX-MCS of the removable and separable TX-RX transformer of the present invention are all connected in series so as to distribute the input power to each sub-TX core. All the windings of the plural (e.g., k) sub-RX cores of the RX-MCS are wound the same way (e.g., center tap two-winding), each winding of each sub-RX core is electrically connected to a corresponding rectifying device, each winding of each sub-RX core and the corresponding rectifying device are electrically connected to the output terminals in parallel to distribute the output current (i.e. the charging current) to each sub-RX core. The purpose of using this winding technique is to decrease the core loss of each sub-TX-RX transformer. On the other hand, this kind of winding design causes each sub-TX-RX transformer to have a turn ratio of $(n_k=N_{pk}/N_{sk})<1$, where $n_k$ indicated a turn ratio of the kth sub-TX-RX transformer, and the purpose of this is to reduce an exciting current on the power element and to decrease the core loss. Practically, the design of the number of turns of each sub-RX core must be determined by considering the magnitude of voltage of the battery pack such that the EMF required by charging has to be larger than the voltage of the battery pack. The present invention proposed two embodiments: the first one is a 450 kW LLC charger charging a 24V battery pack, and the second one is a 1.25 kW LLC charger charging a 48V battery pack to verify the design rules and their feasibility.

Figure 12A:
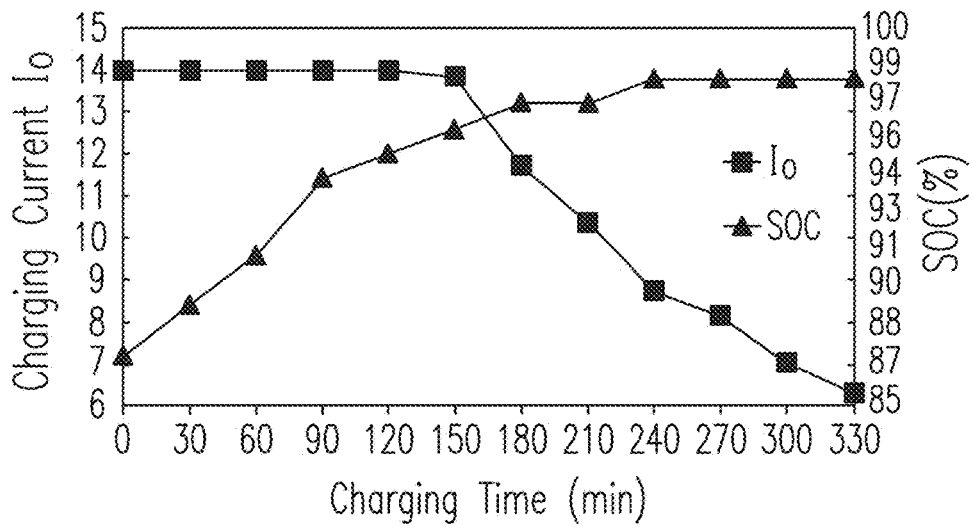
FIG. 12(a) shows a waveform diagram of a charging scenario with current $I_o$=14 A for a 24V battery with COR=100% under self-regulation control: charging current and SOC versus charging time.
Figure 13A:
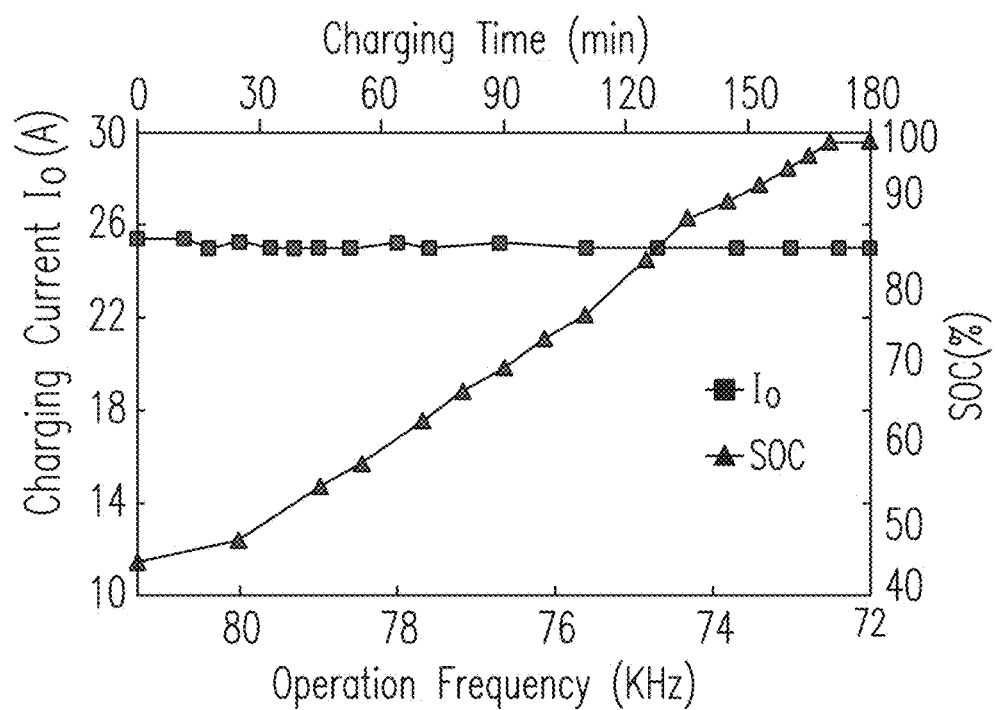
FIG. 13(a) shows a waveform diagram of a charging scenario with current $I_o$=25 A for a 48V battery with COR=100%: charging current and SOC versus charging time and operation frequency.

There are two ways to control the output current. First, the LLC charger operates at a constant-frequency and at a self-regulating control status, and the outputted charging current will be automatically regulating according to a state of charge (SOC) of the battery pack. For example, when the battery pack gradually approaches a full capacity, the inner resistance increases, the circuit quality factor $Q_r$ decreases, and an operating point of the LLC charger moves to an intersection on a characteristic curve of $Q_r$ of light-load, and the charging current decreases so as to achieve a trickle charging mode such that the charging current can be automatically regulated to have a safe charging function as shown in FIG. 12(a). Second, the LLC charger operates under a variable-frequency control mode. First of all, to select the output under a specific operating frequency of the LLC charger as the required charging current value, the LLC charger automatically regulates the operating frequency according to a state of charge (SOC) of the battery pack to cause the charging current to be a constant current. For example, when the SOC of the battery pack increases, the inner resistance increases, which corresponds to that the circuit quality factor $Q_r$ decreases, the LLC charger regulates the operating frequency so as to move an operation point of the LLC charger to a characteristic curve of a relatively heavy load such that the output current won't be decreased and can be maintained at the required current value to achieve a constant current charging mode as shown in FIG. 13(a). This constant current charging mode can be used by quick charge, and this kind of charging achieves a safe charging function by monitoring the battery charging voltage (e.g., SOC) status.

FIG. 1(a) shows a schematic circuit diagram of an LLC charger according to the first preferred embodiment of the present invention. In FIG. 1(a), the LLC charger 1 includes a transmitter 11, a receiver 12 and a transmitter-receiver transformer 13. The transmitter 11 includes a TX-MCS 111 and a power stage 112, wherein the power stage 112 is an LLC converter. The receiver 12 includes an RX-MCS 121 and a rectifier 122. The LLC charger also includes a filter capacitor $C_f$. At the right hand side of FIG. 1(a), it shows a battery pack to be charged by the LLC charger. The battery pack has an output voltage $V_O$. The TX-MCS 111 and the RX-MCS 121 are combined to be an MCS. The circuit pointed by the arrow and located at the lower right corner of FIG. 1(a) is the receiver 12, which indicates that the receiver 12 is movable and separable.

Figure 1B:
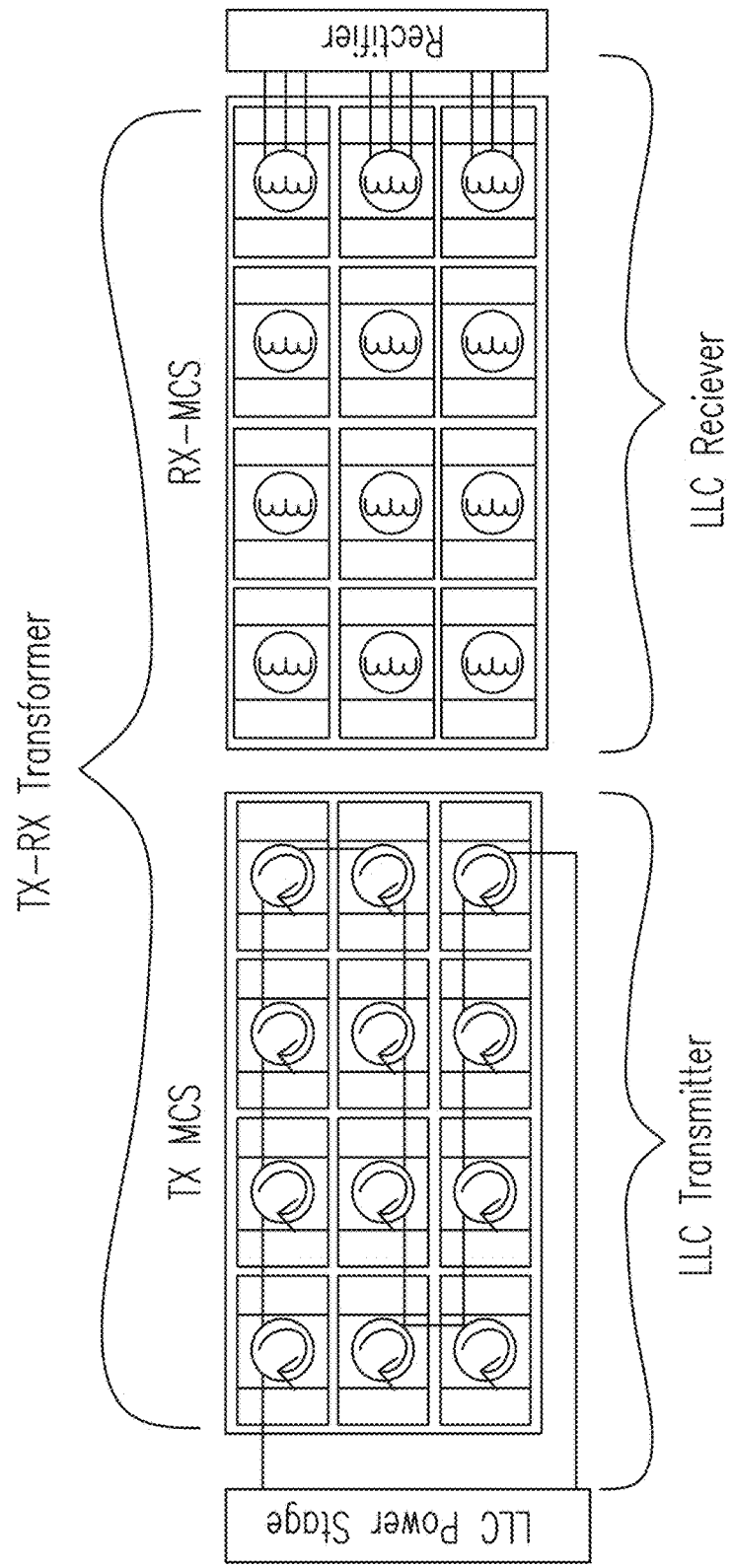
FIG. 1(b) shows a schematic diagram of a physical structure of LLC charger corresponding to FIG. 1(a)

FIG. 1(b) shows a schematic diagram of a physical structure of LLC charger corresponding to FIG. 1(a). As shown in FIG. 1(b), the LLC charger 1 includes the transmitter, the receiver and the TX-RX transformer. In FIG. 1(b), the transmitter is an LLC transmitter, the receiver is an LLC receiver including the RX-MCS and a rectifier. And, the TX-RX transformer includes the TX-MCS and the RX-MCS.

Figure 2A:
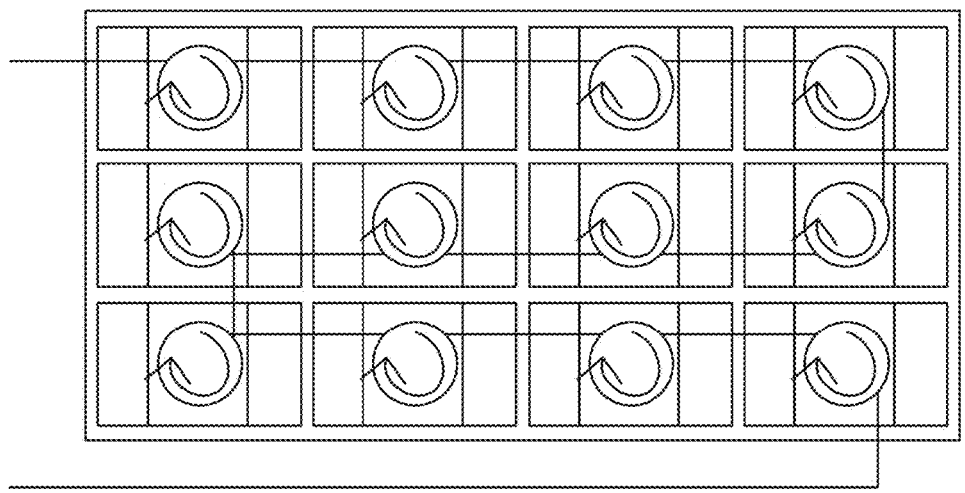
FIG. 2(a) shows a schematic diagram of a winding configuration of all the windings of all the sub-TX cores of the TX-MCS being connected together in series.

FIG. 2(a) shows a schematic diagram of a winding configuration of all the windings of all the sub-TX cores of the TX-MCS 111 being connected together in series.

Figure 2B:
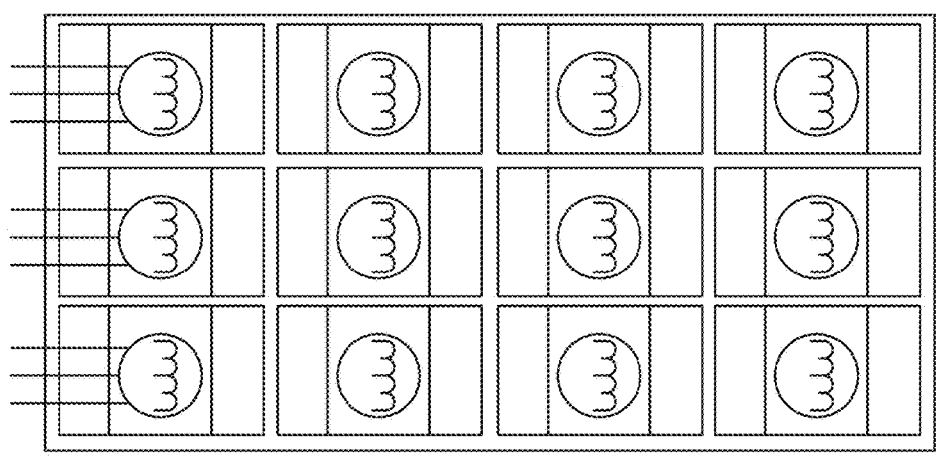
FIG. 2(b) shows a schematic diagram of a winding configuration of all the windings of all the sub-RX cores of the RX-MCS being center tap two-winding.

FIG. 2(b) shows a schematic diagram of a winding configuration of all the windings of all the sub-RX cores of the RX-MCS 121 being center tap two-winding.

Figure 3A:
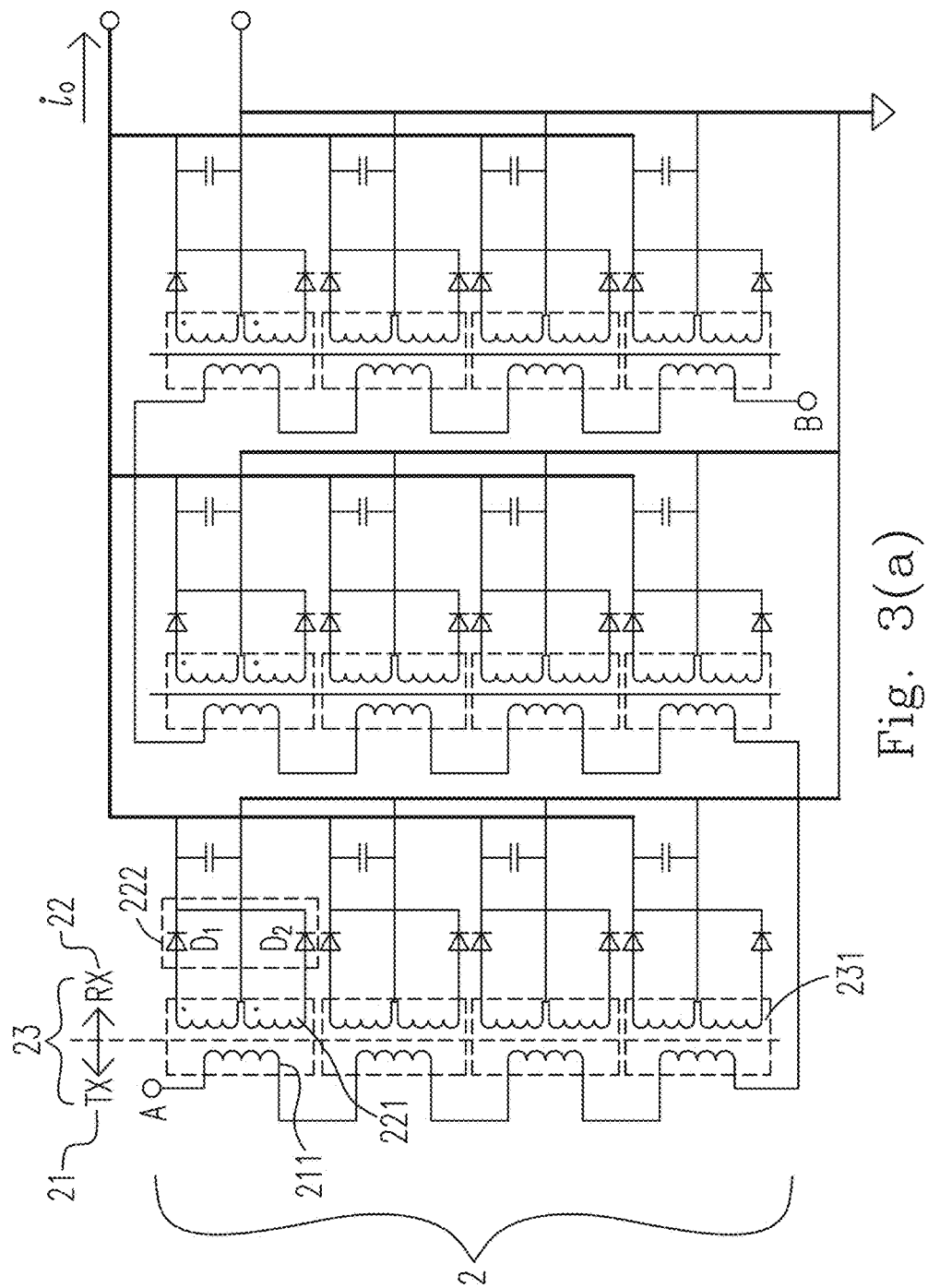
FIG. 3(a) shows a schematic circuit diagram of an LLC charger according to the second preferred embodiment of the present invention.

FIG. 3(a) shows a schematic circuit diagram of an LLC charger according to the second preferred embodiment of the present invention. The LLC charger 2 includes a transmitter 21, a receiver 22 and a TX-RX transformer 23. The TX-RX transformer 23 includes plural sub-transformer 231. The receiver 22 includes a rectifier. The rectifier includes plural rectifying devices 222, each rectifying devices 222 includes two diodes. Each sub-transformer 231 includes sub-TX core 211 and sub-RX core 221. The TX-RX transformer 23 is connected to the diodes of the plural rectifying devices 222 to generate the output current $I_O$.

Figure 3B:
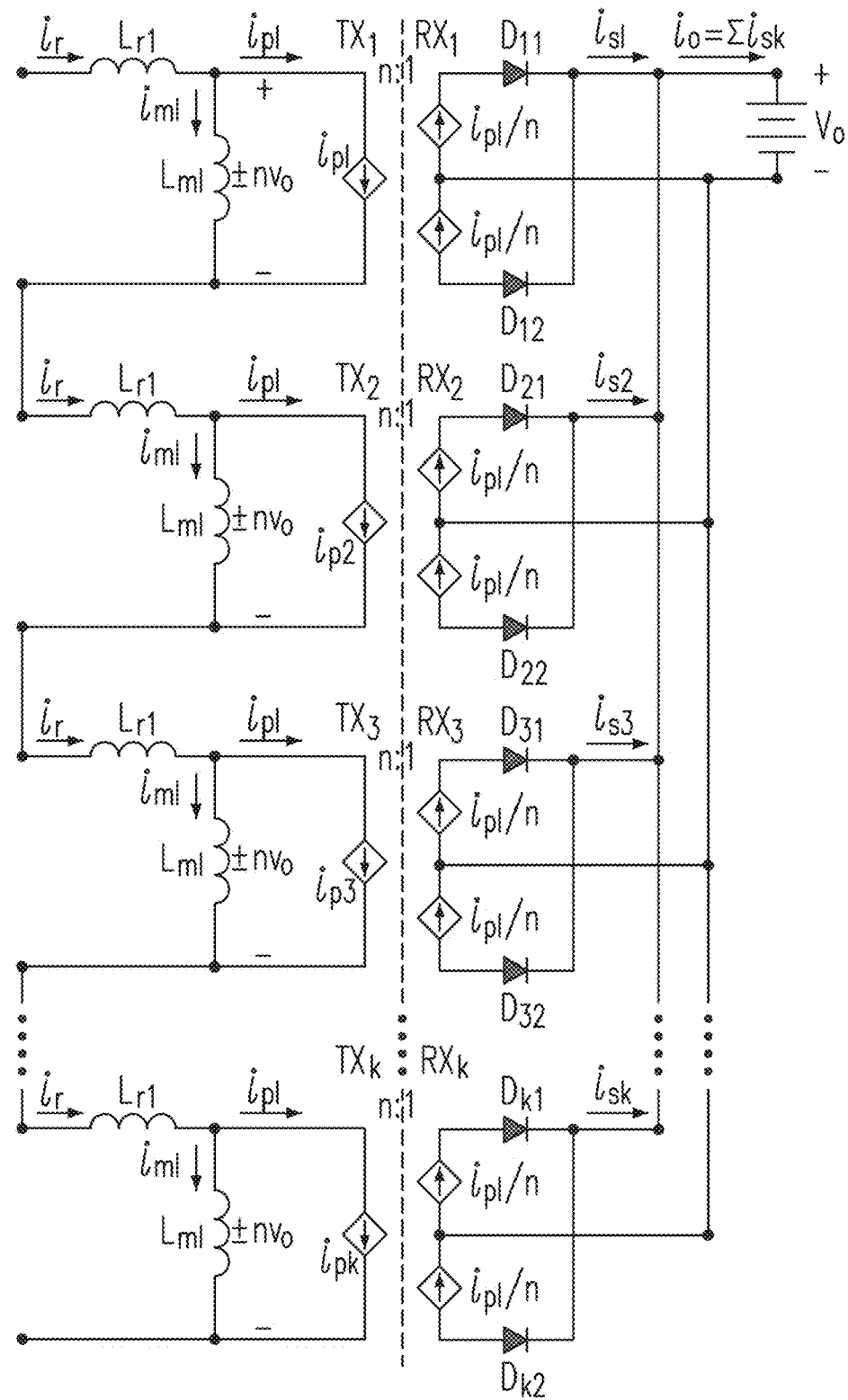
FIG. 3(b) shows a schematic circuit diagram of an operational mode of sub-TX-RX transformer.

FIG. 3(b) shows a schematic circuit diagram of an operational mode of sub-TX-RX transformer. $n_k$ is a turn ratio of the kth sub-TX-RX transformer, $n_k=N_{pk}/N_{sk}$, and all the $n_k$ s are the same. $N_{pk}$ is a number of turns of the winding of sub-TX core, $N_{sk}$ is a number of turns of the winding of sub-RX core. From the equivalent circuit of FIG. 3(b), the total magnetizing inductance $L_m$ is the sum of all the sub-magnetizing inductances.

$$L_m = L_{m1} + L_{m2} + L_{m3} + \ldots + L_{mk} = kL_{m1}, \quad (1)$$

The total leakage inductance $L_r$ will be $$L_r = L_{r1} + L_{r2} + L_{r3} + \ldots + L_{rk} = kL_{r1} \quad (2)$$

The reflected voltage $n_k v_o$ on the primary side of the kth sub-transformer will be $\pm n_k v_o$, where $v_o$ is the output voltage and the symbol $\pm$ is dependent on the state of switches $Q_1$ and $Q_2$ in FIG. 1(a). The sub-magnetizing current in the kth $L_{mk}$ can be estimated as $$\begin{aligned} i_{m1} &= \pm \frac{n_1 v_o}{L_{m1}} t \\ &= i_{m2} = \ldots = i_{mk} \\ &= \pm \frac{n_k v_o}{L_{mk}} t \\ &\equiv i_m \end{aligned} \quad (3)$$

Equation (3) shows that all sub-magnetizing currents flowing through the windings of sub-TX MCSs are in series and are similar to each other since the reflected voltage on all sub-TX MCSs are identical.

Consequently, the current $i_{pk}$ entering the primary side of the kth sub-transformer can be given by $$\begin{aligned} i_{p1} &= i_r - i_{m1} \\ &= i_r - i_{m2} = i_r - i_{m3} = \ldots = i_r - i_{mk} \\ &= i_{pk} \\ &\equiv i_p \end{aligned} \quad (4)$$

Equation (4) shows that all sub-winding currents $i_{pk}$ in TX-MCS are in series and identical to each other, which can be modeled as a dependent current source $i_p$ that is a function of $i_m$ subject to the reflected voltage $nv_o$ on the sub-magnetizing inductance $L_{mk}$. The turns ratio for the kth sub-transformer is defined by $$\begin{aligned} n_k &= \frac{N_{pk}}{N_{sk}} \\ &\equiv n \end{aligned} \quad (5)$$

where $n = n_1 = n_2 = \ldots = n_k$.

After merging all k output currents $i_{sk}$ at the output end, the output current $i_o$ can be given by $$i_o = \sum_k i_{sk} = \frac{\sum_k i_{pk}}{n} = \frac{ki_{p1}}{n} \quad (6)$$
$$= \frac{ki_p}{n}$$

Figure 3C:
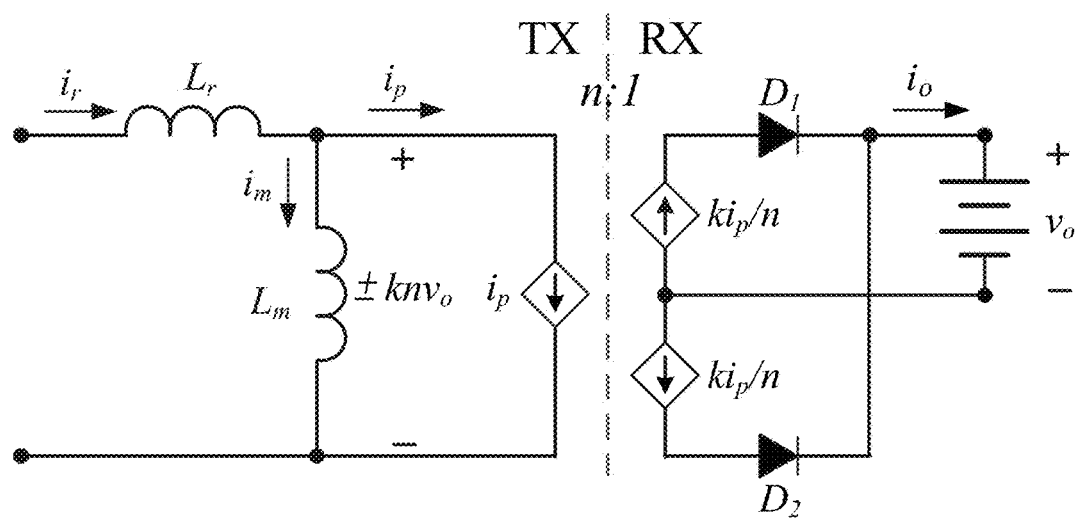
FIG. 3(c) shows a schematic circuit diagram of an operational mode of TX-RX transformer.
Figure 4A:
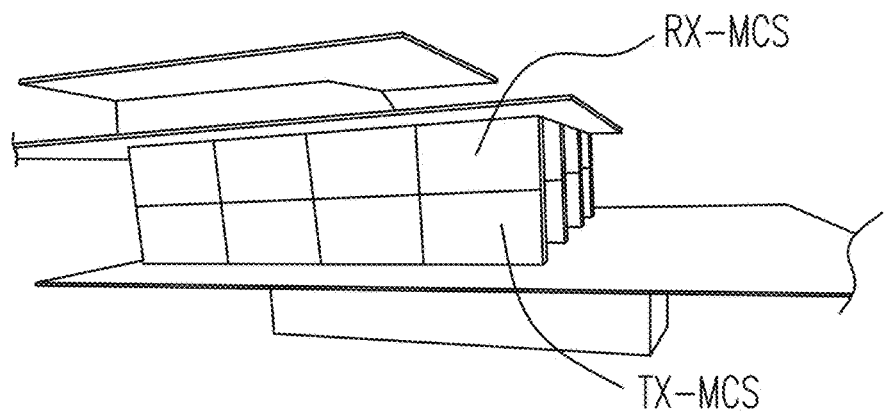
FIG. 4(a) shows a schematic diagrams of a configuration of the relative positions of TX-MCS and RX-MCS when the core overlap rate (COR) is 100%.
Figure 4B:
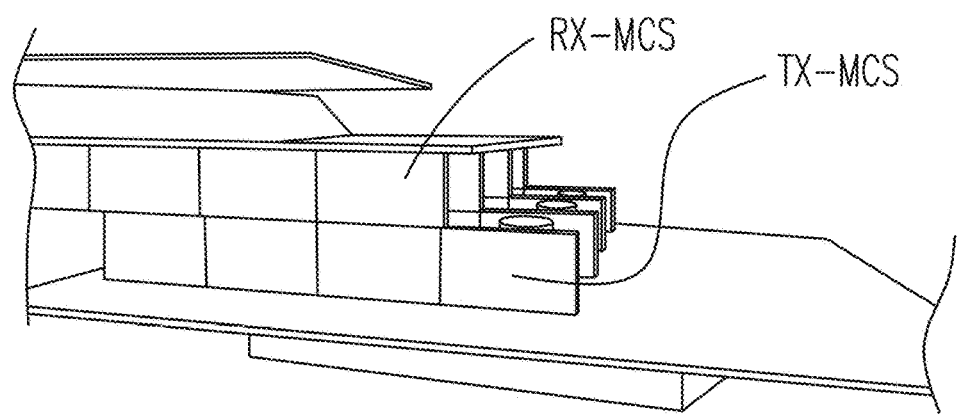
FIG. 4(b) shows a schematic diagram of a configuration of the relative positions of TX-MCS and RX-MCS when the COR is 75%.
Figure 4C:
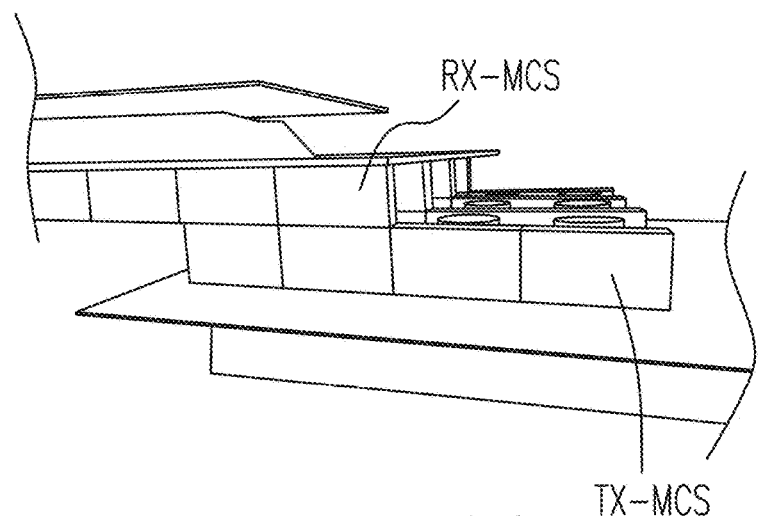
FIG. 4(c) shows a schematic diagram of a configuration of the relative positions of TX-MCS and RX-MCS when the COR is 50%.
Figure 4D:
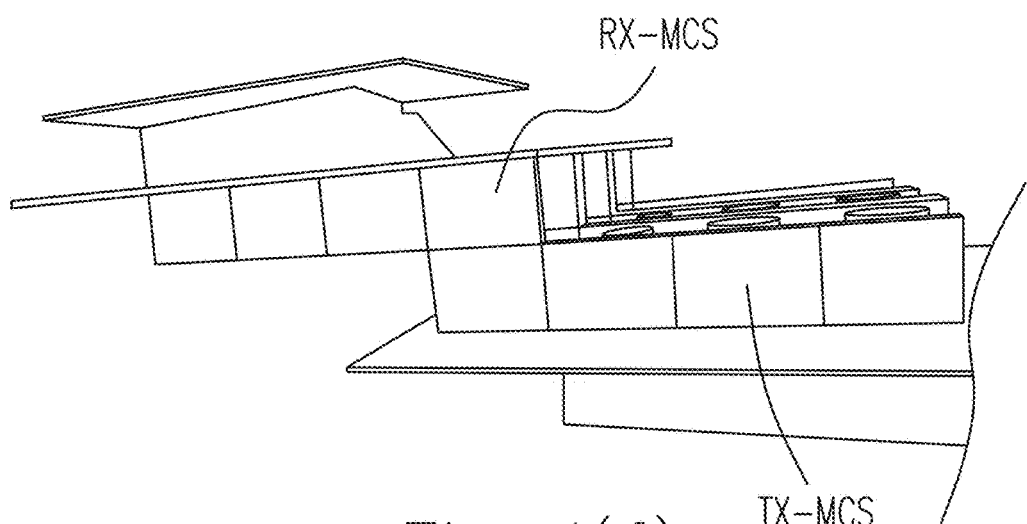
FIG. 4(d) shows a schematic diagram of a configuration of the relative positions of TX-MCS and RX-MCS when the COR is 25%.

From equations (1)-(6), the general model of the TX-RX transformer with full-wave rectifier is then built in FIG. 3(c), which is valid for TX-MCS and RX-MCS coupling in the full overlap situation. FIG. 3(c) shows a schematic circuit diagram of an operational mode of TX-RX transformer.

FIGS. 4(a) to 4(d) respectively show schematic diagrams of configurations of the relative positions of TX-MCS and RX-MCS when the respective core overlap rates (CORs) are 100%, 75%, 50% and 25%.

The magnetizing currents for all sub-transformers are also equal and can be given by:

$$i_m(t) = -\frac{n_k V_o}{L_m} \cdot \frac{T}{4}\cos\omega t \quad (7)$$

where T is the switching period.

Figure 5A:
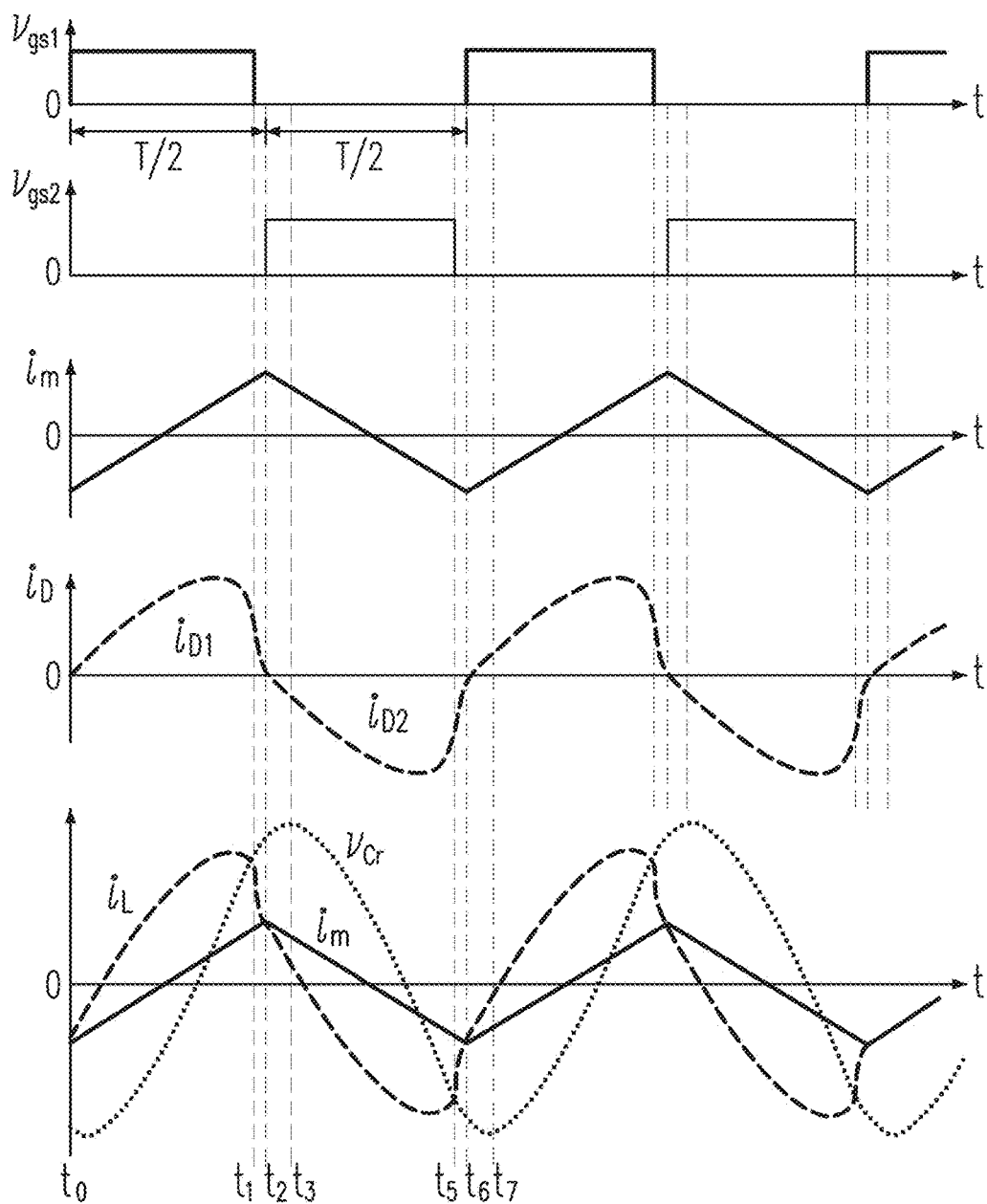
FIG. 5(a) shows a waveform diagram of the typical time response of LLC resonant behavior when $f>f_{r1}$.
Figure 5B:
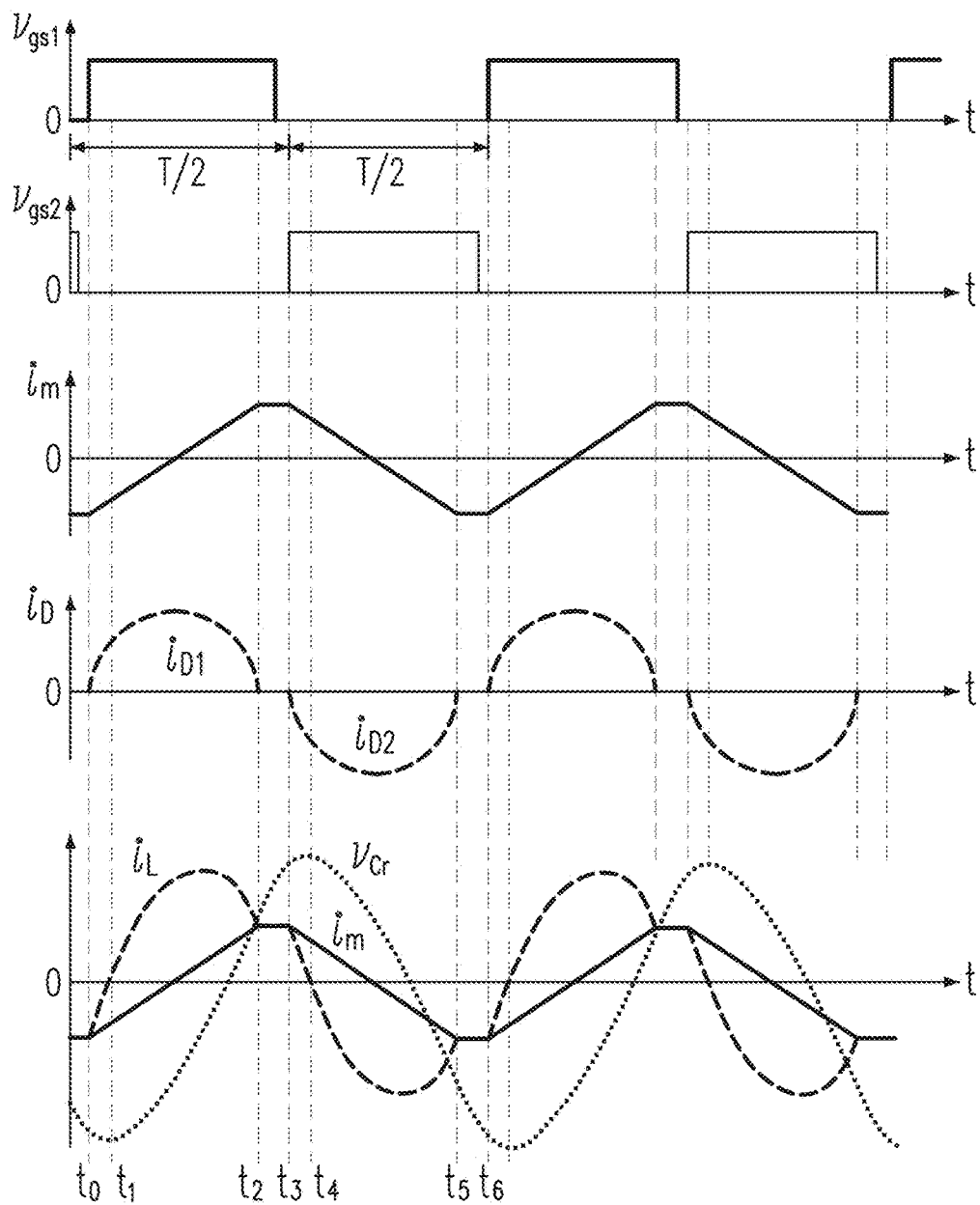
FIG. 5(b) shows a waveform diagram of the typical time response of LLC resonant behavior when $f_{r2}<f<f_{r1}$.

FIG. 5(a) shows a waveform diagram of the typical time response of LLC resonant behavior when $f > f_{r1}$. FIG. 5(b) shows a waveform diagram of the typical time response of LLC resonant behavior when $f_{r2} < f < f_{r1}$.

If k sub-transformers fully overlap, the turns ratio of each sub-transformer can be given by $$n_k = \frac{\eta}{2k} \cdot \frac{V_{dc}}{V_o} \quad (8)$$

where $V_o$ is the voltage of the battery pack at the output end and $n_1 = n_2 = n_3 = \ldots = n_k$ since all sub-transformers are presumed identical.

Figure 6A:
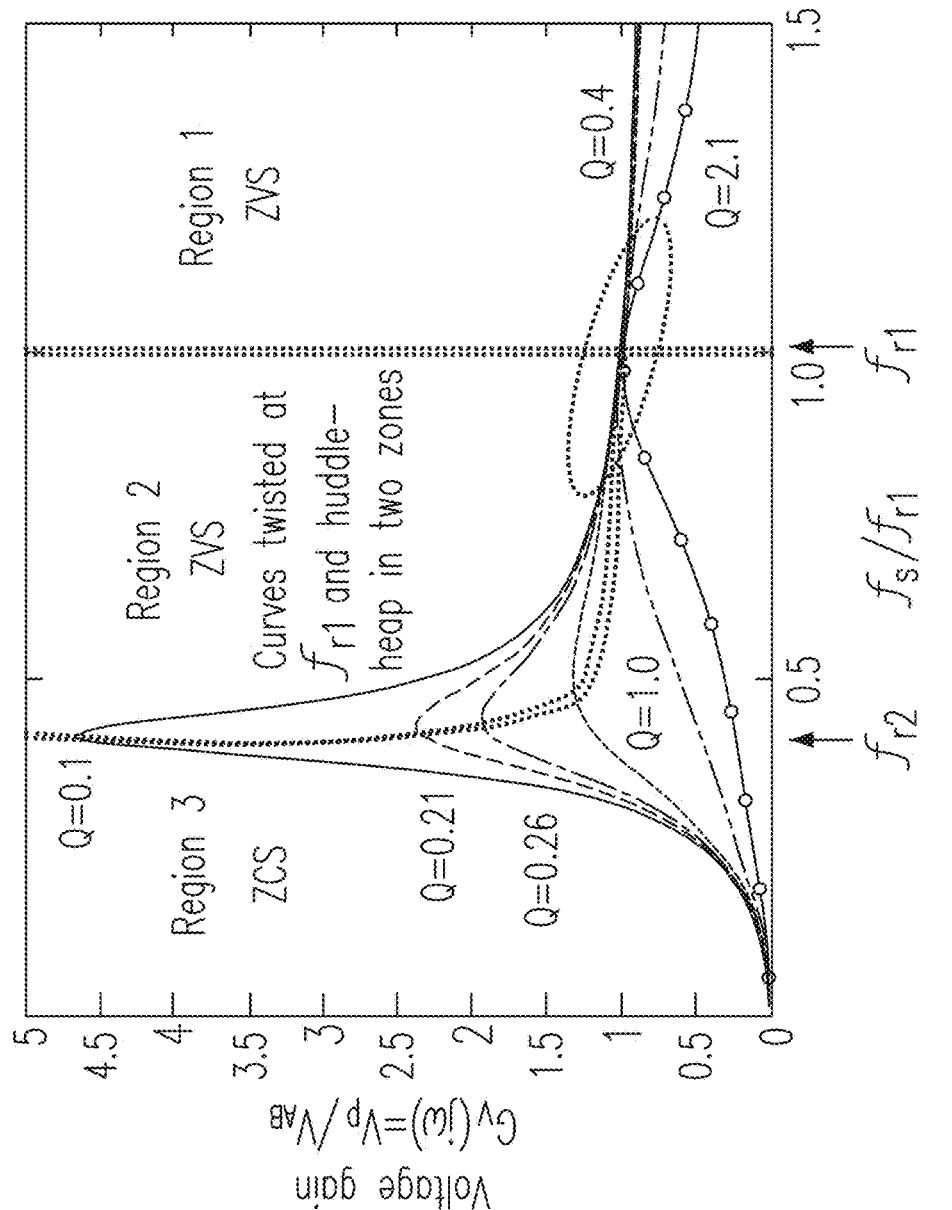
FIG. 6(a) shows a waveform diagram of voltage gain $G_v(j\omega)$ versus fs/fr1 depicting the LLC DC characteristics.

FIG. 6(a) shows a waveform diagram of voltage gain $G_v(j\omega)$ versus fs/fr1 depicting the LLC DC characteristics.

Figure 6B:
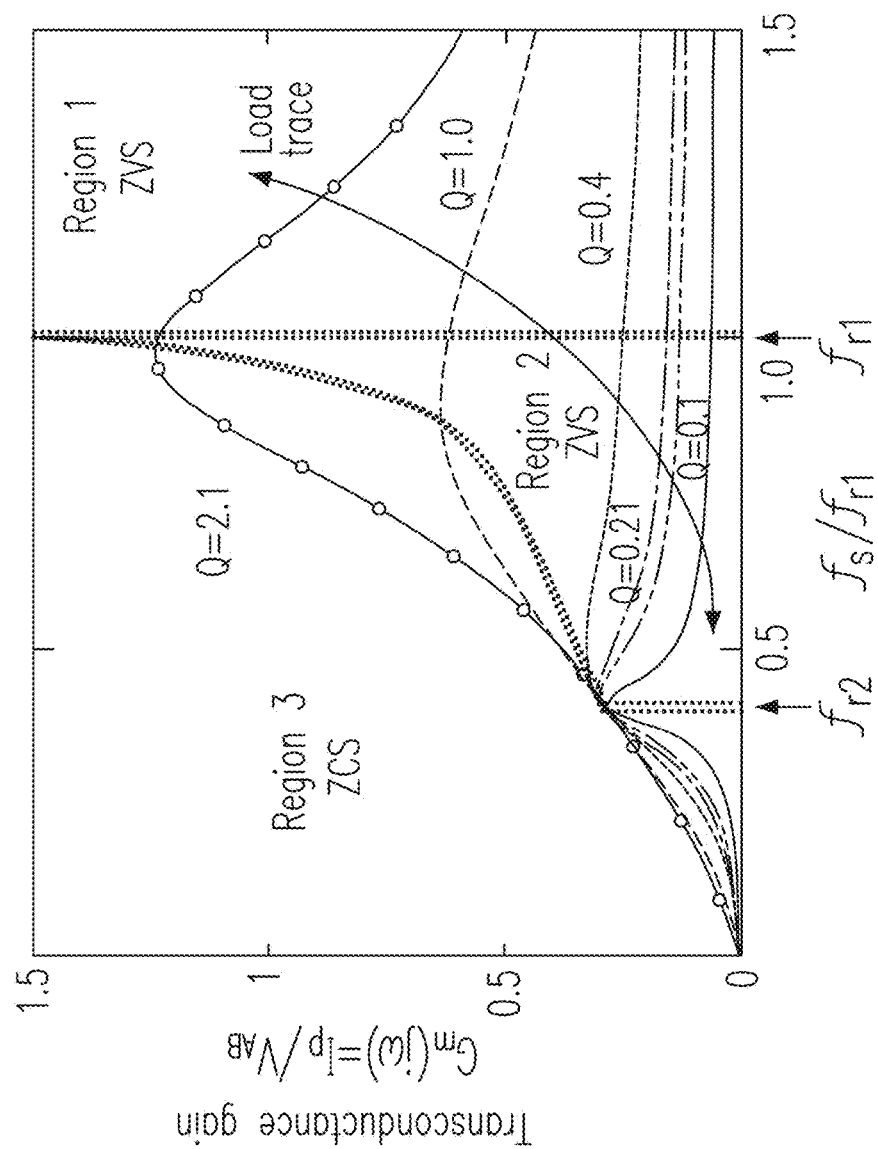
FIG. 6(b) shows a waveform diagram of transconductance gain $G_m(j\omega)$ versus fs/fr1 depicting the LLC DC characteristics.

FIG. 6(b) shows a waveform diagram of transconductance gain $G_m(j\omega)$ versus fs/fr1 depicting the LLC DC characteristics.

In FIG. 1(a), the first inherent frequency $f_{r1}$ due to the resonant inductance $L_r$ and the resonant capacitance $C_r$ is given by $$\omega_{r1} = \frac{1}{\sqrt{L_r C_r}} \quad (9)$$

The second frequency $f_{r2}$ mainly due to the magnetizing inductance $L_m$ will be $$\omega_{r2} = \frac{1}{\sqrt{(L_r + L_m)C_r}} \quad (10)$$

The transconductance gain $G_m(j\omega)$ derived from FIG. 1(a) is given by $$G_m(j\omega) = \frac{I_p}{V_{AB}} = \frac{1}{\left(\frac{\omega_r^2}{\omega_{rm}^2} - \frac{\omega_r^2}{\omega^2}\right) \cdot \frac{1}{K} - jQ_r\left(\frac{\omega_r}{\omega} - \frac{\omega}{\omega_r}\right)} \cdot \frac{1}{R_{ac}} \quad (11)$$

where the resonant inductance ratio is defined as:

$$K \equiv \frac{L_m}{L_r} \quad (12)$$

The circuit quality factor $$Q_r = \frac{1}{R_{ac}}\sqrt{\frac{L_r}{C_r}} \quad (13)$$

and the ac equivalent impedance $R_{ac}$ looking into the primary side of the TX-RX transformer are obtained by using fundamental approximation:

$$R_{ac} = k \cdot \frac{8n^2}{\pi^2} R_o \quad (14)$$

where $R_o$ is the equivalent output resistance that is the internal charging resistance of the battery pack. The power transfer to the load, $P_L$ can be easily found by:

$$P_L = i_{p,rms}^2 R_{ac} \quad (15)$$
$$= \left[\frac{2}{\pi} \cdot \frac{I_{sk}}{n} \cdot \frac{1}{\sqrt{2}}\right]^2 R_{ac}$$
$$= \frac{16kI_{sk}R_o}{\pi^2}$$

The maximum magnetizing inductance $L_m$ for each sub-transformer can then be estimated as $$L_m < \frac{3}{128} \frac{\eta T^2}{C_o k^2} \quad (16)$$

Since the voltage on the resonant capacitor $C_r$ at resonance will be $Q_r(V_{dc}/2)$, the charge $Q_{Cr}$ in $C_r$ can be estimated as $$Q_{Cr} = C_r Q_r \frac{V_{dc}}{2} \quad (17)$$
$$= i_{r,av} \cdot T$$
$$= \frac{I_o T}{2kn}$$

and the resonant capacitance and inductance will be $$C_r = \frac{I_o T}{knQ_r V_{dc}} \text{ and} \quad (18)$$

-continued $$L_r = C_r(R_{ac}Q_r)^2 \qquad (19)$$

Let the output voltage ripple on the battery pack be $\Delta V_o$. The filter capacitor $C_f$ for rejecting sinusoidal-like full-wave ripples can be estimated by:

$$C_f = \frac{\sqrt{2}\,V_o}{2f_s R_o \Delta V_o} = \frac{\sqrt{2}\,I_o}{2f_s \Delta V_o} \qquad (20)$$

The required winding turn $N_{sk}$ can be estimated by $$N_{sk} \geq \left(\frac{d\phi_k}{dt}\right)^{-1} V_B \qquad (21)$$

Figure 8A:
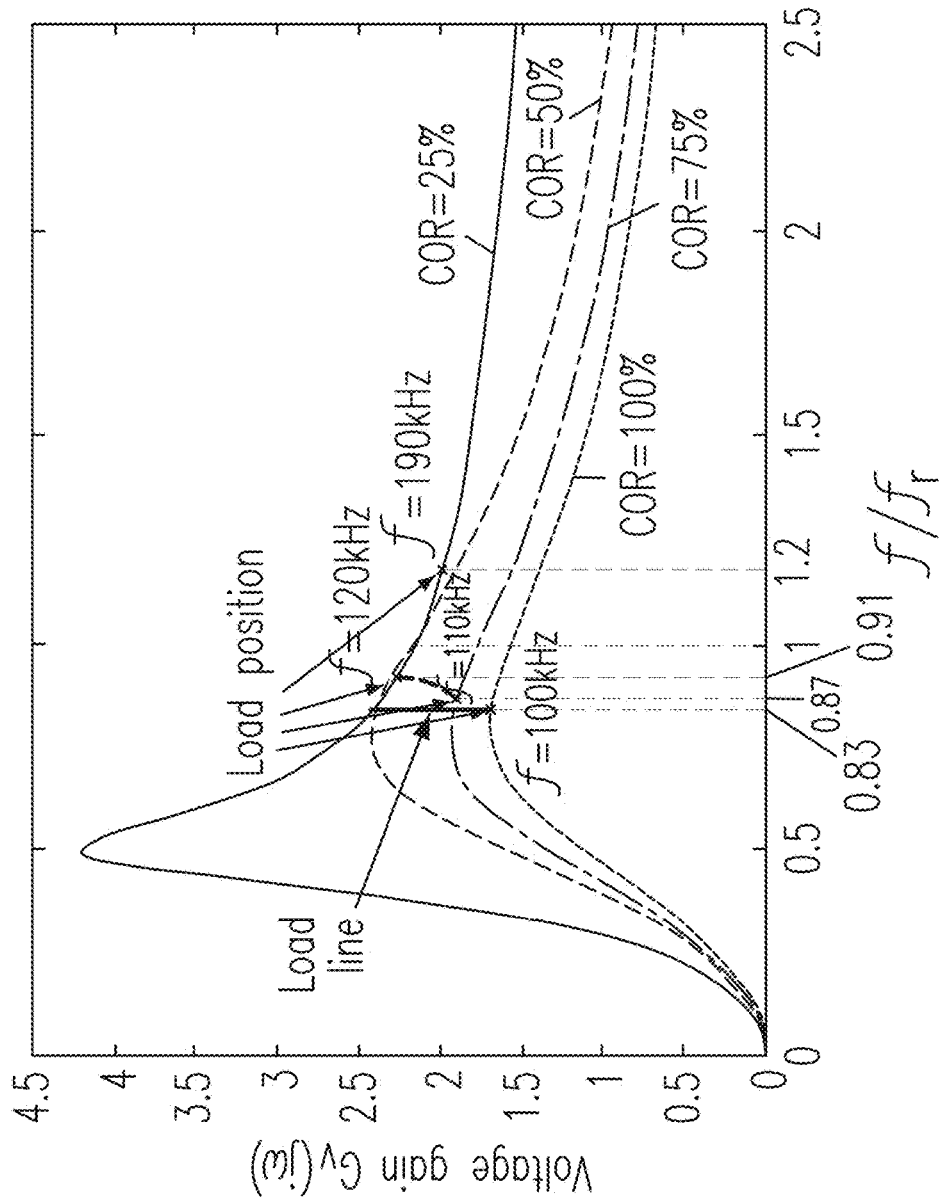
FIG. 8(a) shows a waveform diagram of load position and trace depictions in four typical scenarios for the LLC charger to a 24V battery pack described by $G_v(j\omega)$ responses for the cases of COR=¼, ²⁄₄, ¾, and 4/4, respectively.
Figure 8B:
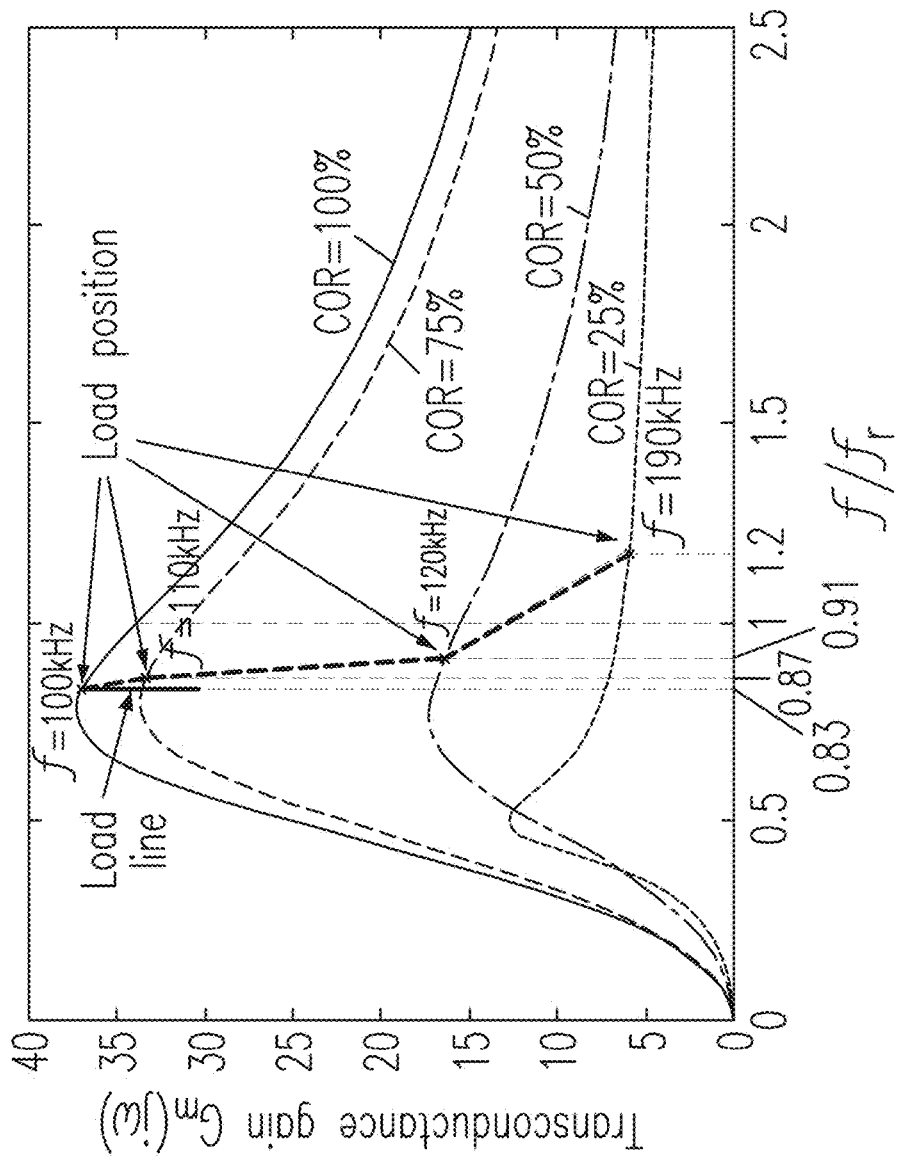
FIG. 8(b) shows a waveform diagram of load position and trace depictions in four typical scenarios for the LLC charger to a 24V battery pack described by $G_m(j\omega)$ responses for the cases of COR=¼, ²⁄₄, ¾, and 4/4, respectively.
Figure 9:
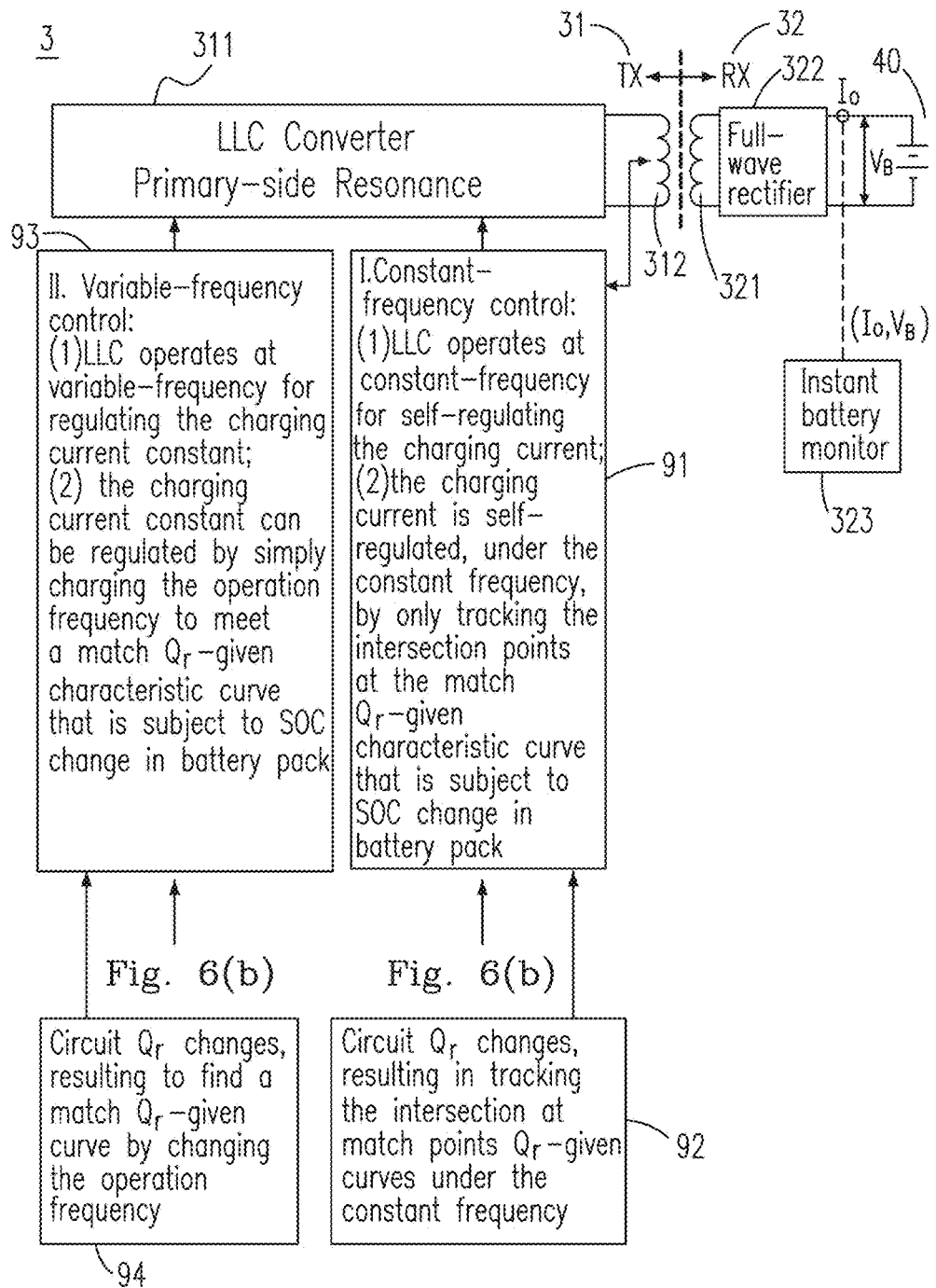
FIG. 9 shows a schematic circuit diagram of an LLC charger according to the third preferred embodiment of the present invention and two kinds of control strategies: (1) the constant-frequency control for self-regulating the charging current, and (2) the variable-frequency control for regulating charging current constant.

FIG. 9 shows a schematic circuit diagram of an LLC charger according to the third preferred embodiment of the present invention and two kinds of control strategies: (1) the constant-frequency control for self-regulating the charging current, and (2) the variable-frequency control for regulating charging current constant. In FIG. 9, it includes an LLC charger 3. The LLC charger 3 includes a transmitter 31 and a receiver 32. The transmitter 31 includes an LLC converter 311 and a TX-MCS 312. The receiver 32 includes an RX-MCS 321, a full-wave rectifier 322 and an instant battery monitor 323. The instant battery monitor 323 is used to monitor the output current $I_O$ and the output voltage $V_B$ of the battery pack 40. In FIG. 9, it also includes steps 91-94. For self-regulating, in step 91, the LLC charger operates at a constant-frequency to produce a desired charging current according to the circuit $Q_r$-given characteristic curve from the State of Charge (SOC) change on the battery pack as shown in FIG. 6(b). After then, in step 92, the LLC charger will self-regulate the charging current by only tracking the intersection points at the $Q_r$-given characteristic curve under constant frequency, in which the tracking trace is displayed as the bold load line in FIGS. 8(a)-8(b). For variable-frequency control, in step 93, the LLC charger operates at a frequency to produce the desired constant current for charging according to a match $Q_r$-given characteristic curve as shown in FIG. 6(b). After then, in step 94, the LLC charger will promptly regulate the charging current constant by simply changing the operation frequency to further meet a match $Q_r$-given characteristic curve. These two control ways are demonstrated and evidenced by experiments in the following design examples.

EXPERIMENT

A 450 W LLC charger is designed using constant-frequency control for self-regulation to charge a 24V battery pack (two lead-acid batteries, LAB, connected in series) suitable for home-use night-charging applications, where the LAB is GC2-1275/12V/150AH/KAWASAKI. In addition, a 1.25 kW 48V (four batteries connected in series) is also demonstrated using variable-frequency control to describe how to maintain the charging current constant. In this experiment, the movable TX-RX transformer is composed of twelve PQ cores with a k=12 layout in a 4 by 3 matrix form for example. The power efficiency is predicted to be r=0.9 in full core overlap coupling with COR=100%.

Figure 7A:
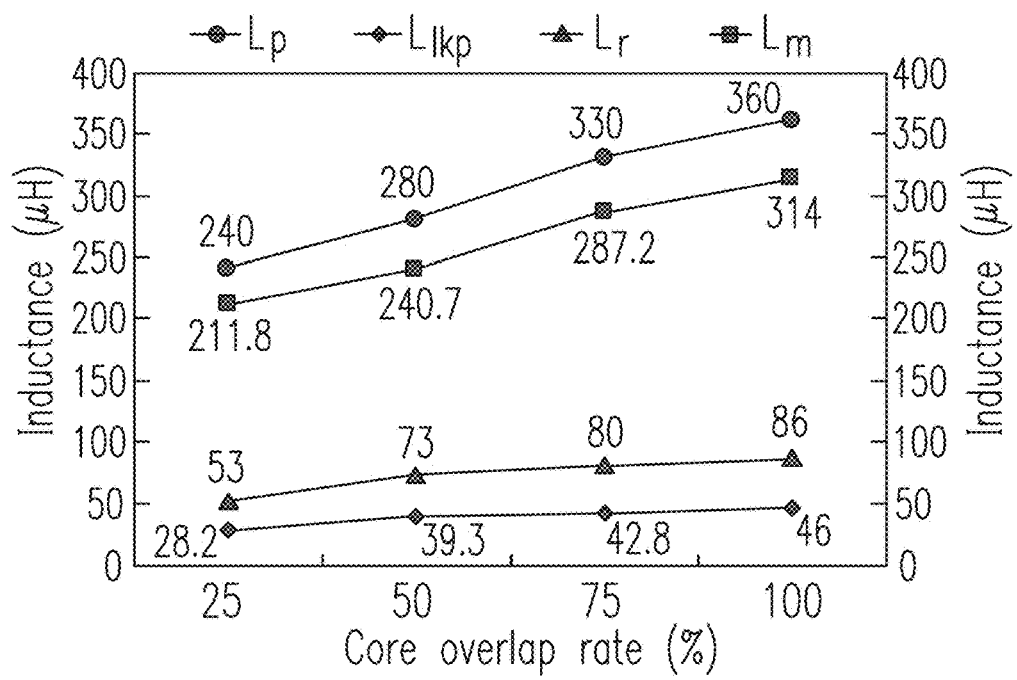
FIG. 7(a) shows a waveform diagram of the measured inductance responses of the TX-RX transformer for the four kinds of COR scenarios.
Figure 7B:
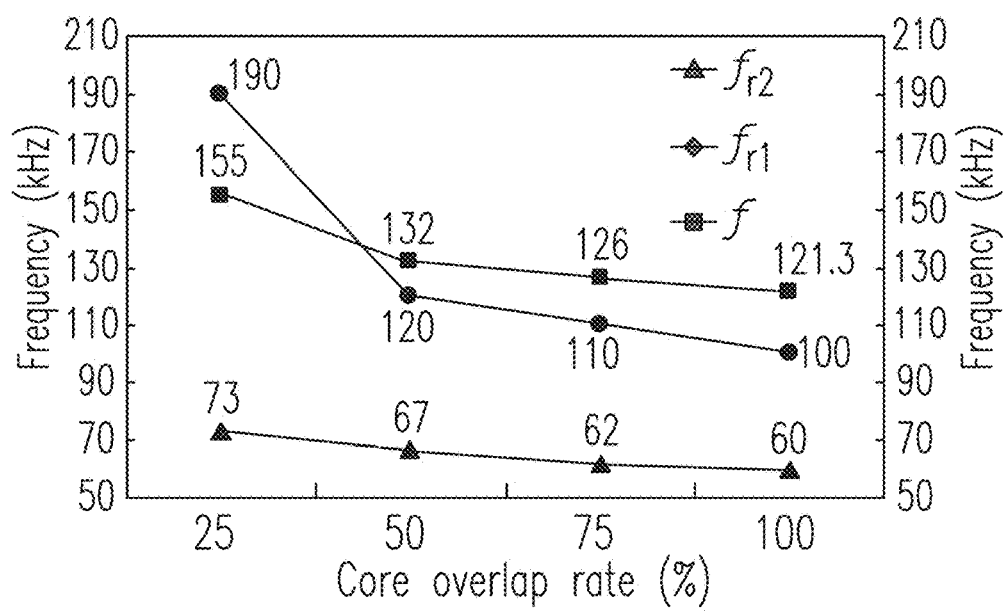
FIG. 7(b) shows a waveform diagram of the first and the second resonant frequencies, $f_{r1}$ and $f_{r2}$, and the operation frequency f with respect to the four typical CORs.

The inductance responses of the TX-RX transformer for the four kinds of COR scenarios are simulated in FIG. 7(a), in which the leakage $L_{lkp}$ and inductance $L_p$ measured at the TX side are also involved. The magnetizing inductance $L_m$ seems to decrease linearly with a decreasing COR; correspondingly, the resonant inductance $L_r$ decreases slowly but decreases rapidly for COR=25% because the leakage inductance $L_{lkp}$ seems almost constant for COR=25-100%. Remarkably, the decrease of magnetizing inductance $L_m$ due to low COR may increase the magnetizing current to cause a large circulation conduction loss in power switches that may deteriorate the power efficiency. Therefore, input voltage derating to reduce magnetizing circulation current for improving the power efficiency is preferred. According to the measured data in Table 1, the resonant frequency sets $(f_{r2}, f_{r1})$ for the four kinds of CORs are depicted in FIG. 7(b), in which $f_{r2}$ seems almost double $f_{r1}$ for all COR cases. In addition, the $G_v(j\omega)$ and $G_m(j\omega)$ responses for the four cases of CORs are also simulated in FIGS. 8(a)-8(b).

TABLE 1

Measured parameters for the four typical COR scenarios under TX-MCS and RX-MCS coupled in close proximity @ for LLC charger to 24 V battery pack

| Core Overlap Rate COR (%) | Magnetizing Inductance $L_m$ (μH) | Resonant Inductance $L_r$ (μH) | Resonant Capacitance $C_r$ (μF) | Resonant Frequency $f_{r1}$ (kHz) | Resonant Frequency $f_{r2}$ (kHz) |
|---|---|---|---|---|---|
| 25 (1/4) | 212 | 53 | 0.02 | 155 | 73 |
| 50 (2/4) | 241 | 73 | 0.02 | 132 | 67 |
| 75 (3/4) | 287 | 80 | 0.02 | 126 | 62 |
| 100 (4/4) | 314 | 86 | 0.02 | 121 | 59 |

Figure 10A:
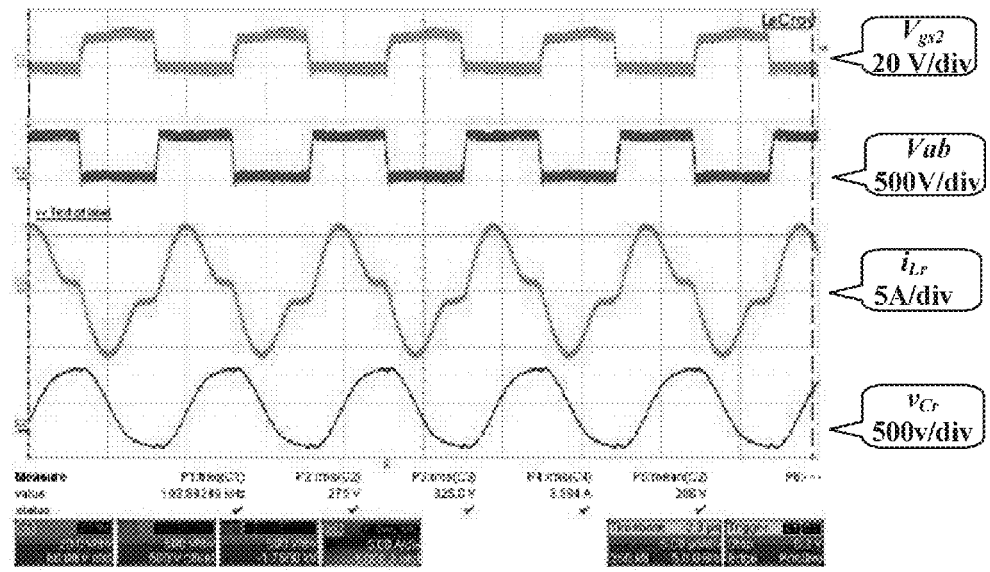
FIG. 10(a) shows a measured waveform at TX side for COR=100%, where operation frequency $f_s$=102 kHz and charging current $I_o$=14 A.

FIG. 10(a) shows a measured waveform at TX side for COR=100%, where operation frequency $f_s$=102 kHz and charging current $I_o$=14 A.

Figure 10B:
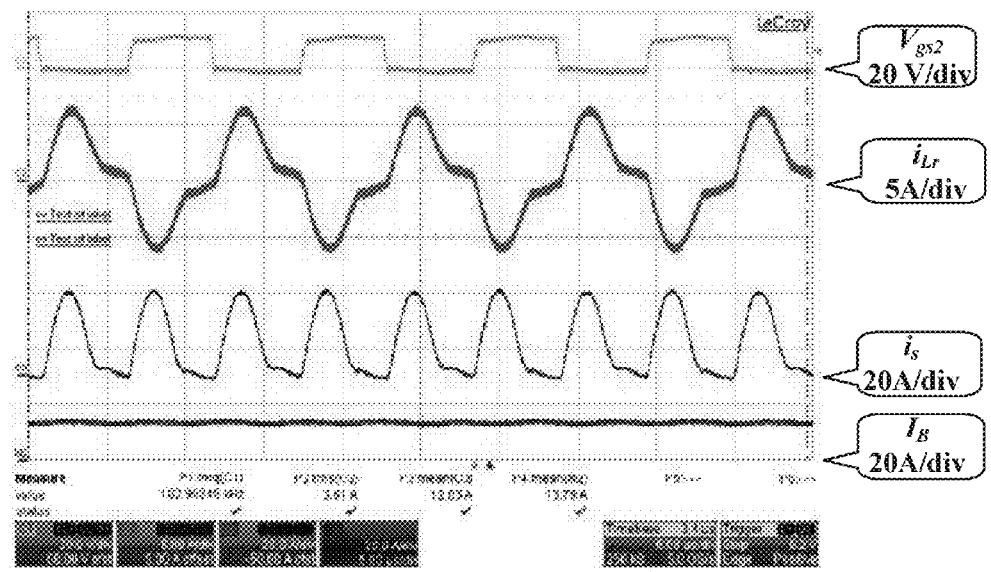
FIG. 10(b) shows a measured waveform at RX side for COR=100%, where operation frequency f=102 kHz and charging current $I_o$=14 A.

FIG. 10(b) shows a measured waveform at RX side for COR=100%, where operation frequency $f_s$=102 kHz and charging current $I_o$=14 A.

Figure 10C:
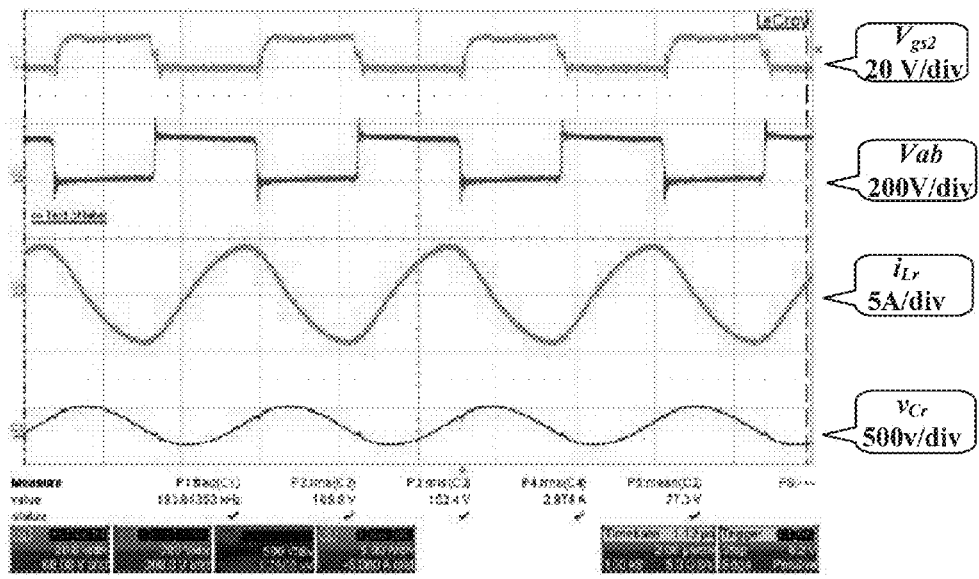
FIG. 10(c) shows a measured waveform at TX side for COR=25%, where $f_s$=192 kHz and $I_o$=2 A.
Figure 10D:
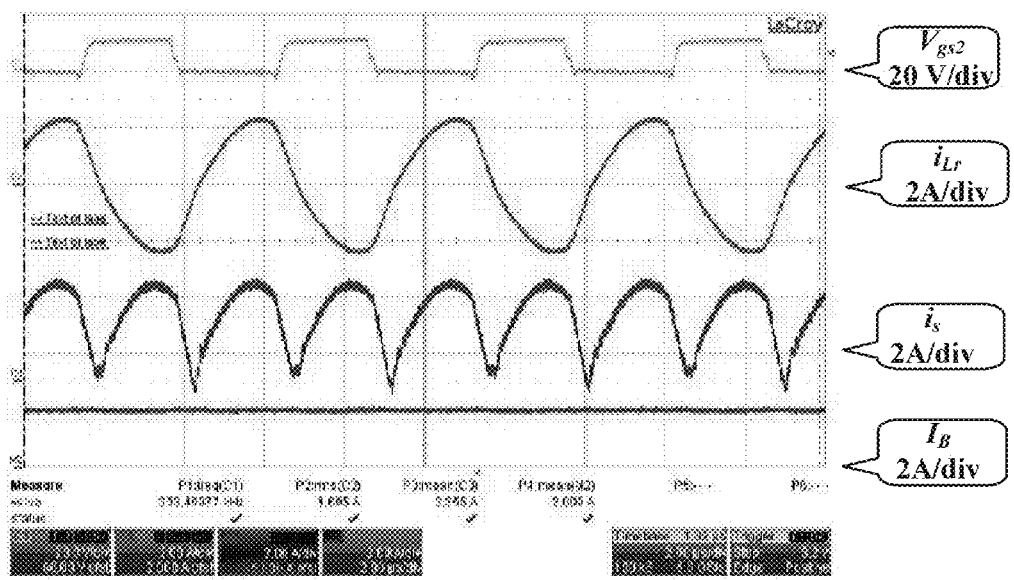
FIG. 10(d) shows a measured waveform at RX side for COR=25%, where $f_s$=192 kHz and $I_o$=2 A.

FIG. 10(c) shows a measured waveform at TX side for COR=25%, where $f_s$=192 kHz and $I_o$=2 A FIG. 10(d) shows a measured waveform RX side for COR=25%, where $f_s$=192 kHz and $I_o$=2 A.

Figure 11:
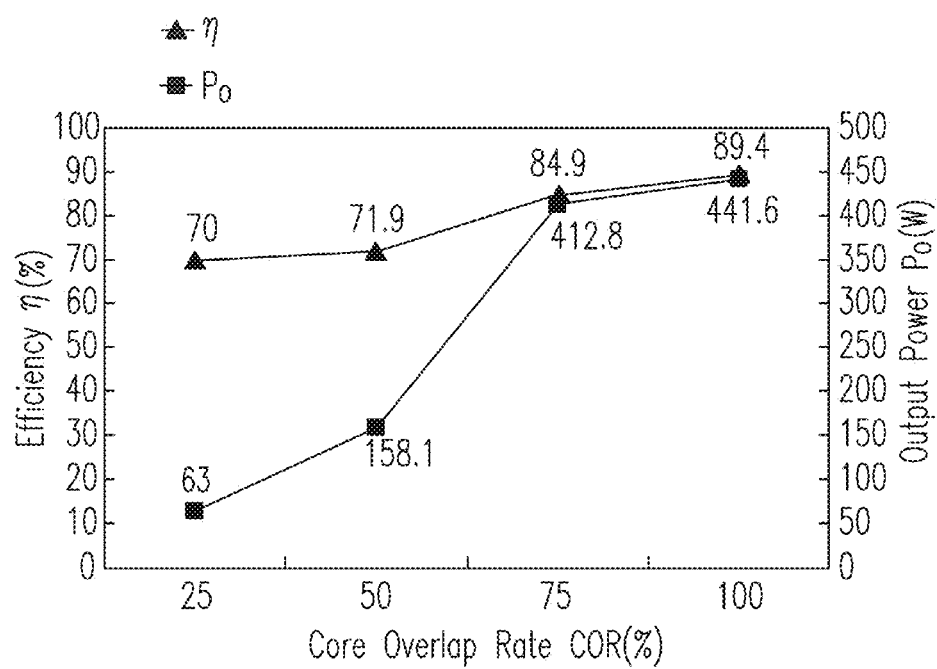
FIG. 11 shows a waveform diagram of output power and efficiency with respect to the four typical CORs.

FIG. 11 shows a waveform diagram of output power and efficiency with respect to the four typical CORs.

FIG. 12(a) shows a waveform diagram of a charging scenario with current $I_o$=14 A for a 24V battery with COR=100% under self-regulation control: charging current and SOC versus charging time.

Figure 12B:
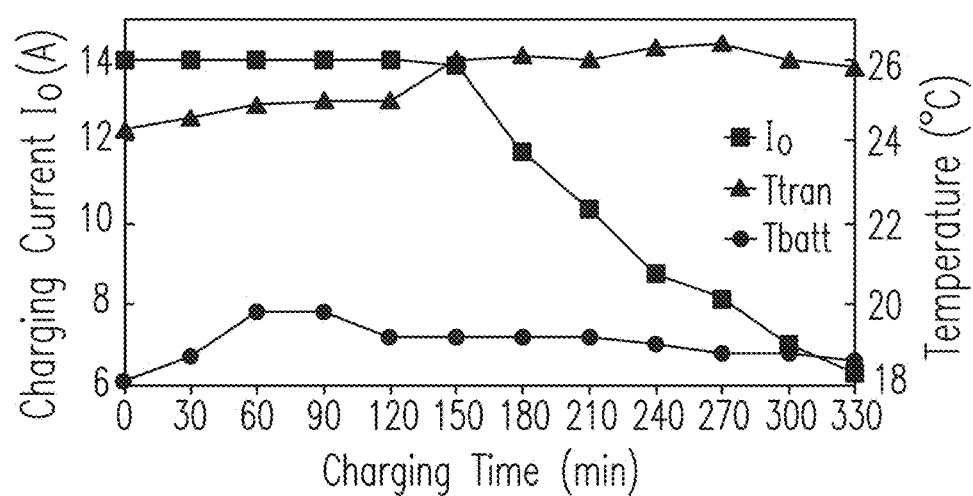
FIG. 12(b) shows a waveform diagram of a charging scenario with current $I_o$=14 A for a 24V battery with COR=100% under self-regulation control: TX-RX transformer temperature $T_{tran}$ and battery temperature $T_{batt}$ with respect to charging time (min), under charging current $I_o$ @ room temperature of 18° C.

FIG. 12(b) shows a waveform diagram of a charging scenario with current $I_o$=14 A for a 24V battery with COR=100% under self-regulation control: TX-RX transformer temperature $T_{tran}$ and battery temperature $T_{batt}$ with respect to charging time (min), under charging current $I_o$ @ room temperature of 18° C.

FIG. 13(a) shows a waveform diagram of a charging scenario with current $I_o$=25 A for a 48V battery with COR=100%: charging current and SOC versus charging time and operation frequency.

Figure 13B:
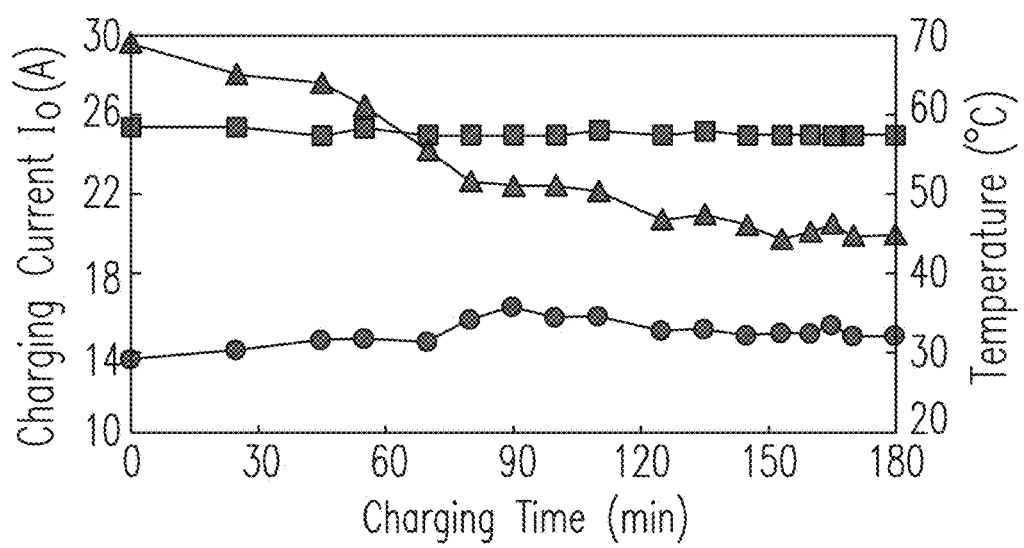
FIG. 13(b) shows a waveform diagram of a charging scenario with current $I_o$=25 A for a 48V battery with COR=100%: TX-RX transformer temperature $T_{tran}$ and battery temperature $T_{batt}$ with respect to charging time (min), under charging current $I_o$=25 A @ room temperature of 26° C.

FIG. 13(b) shows a waveform diagram of a charging scenario with current $I_o$=25 A for a 48V battery with COR=100%: TX-RX transformer temperature $T_{tran}$ and battery temperature $T_{batt}$ with respect to charging time (min), under charging current $I_o$=25 A @ room temperature of 26° C.

Figure 14A:
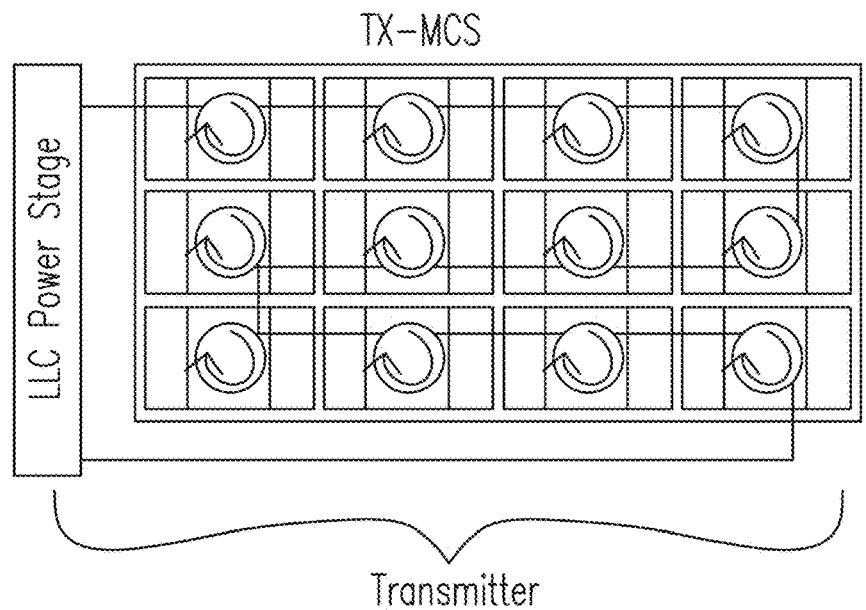
FIG. 14(a) shows a schematic diagram of Experimental setup of the LLC charger including the LLC power stage and the TX-MCS.

FIG. 14(a) shows a schematic diagram of Experimental setup of the LLC charger including the LLC power stage and the TX-MCS.

Figure 14B:
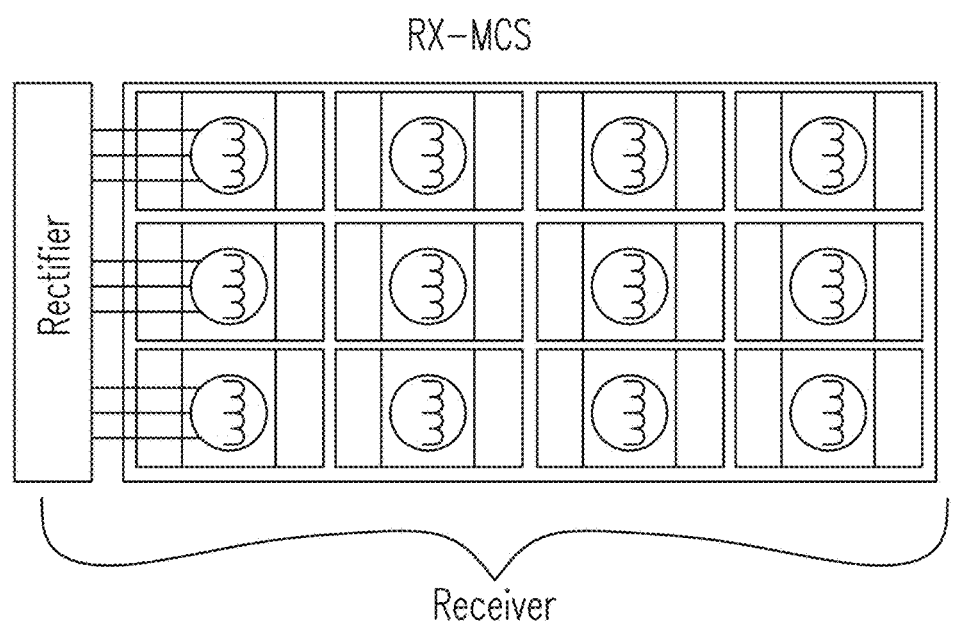
FIG. 14(b) shows a schematic diagram of Experimental setup of the Rectifier and the RX-MCS.

FIG. 14(b) shows a schematic diagram of Experimental setup of the Rectifier and the RX-MCS.

Figure 14C:
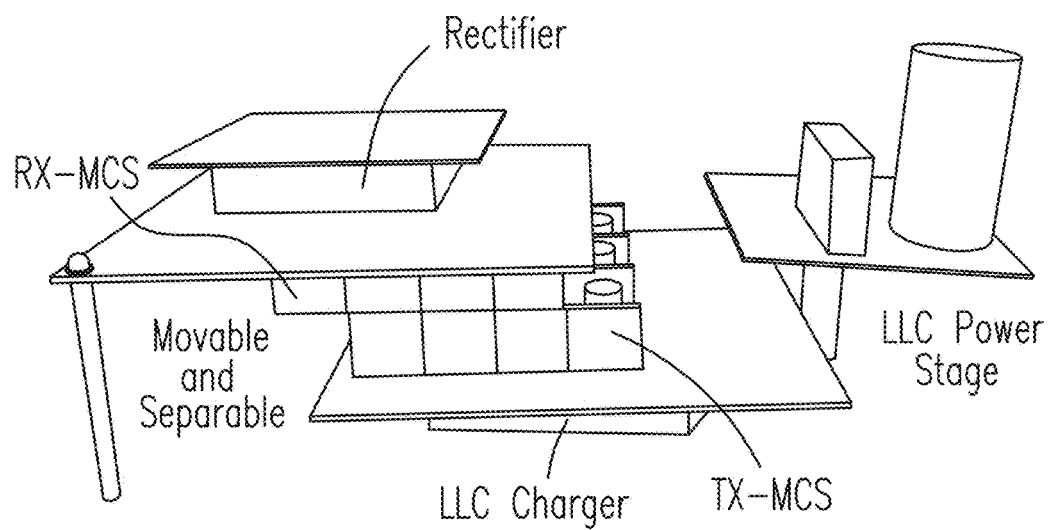
FIG. 14(c) shows a schematic diagram of Experimental setup of the LLC charger with movable and separable TX-RX MCS.

FIG. 14 (c) shows a schematic diagram of Experimental setup of the LLC charger with movable and separable TX-RX MCS.

Conclusion

This study successfully shows that the LLC charger using a movable and separable TX-RX transformer with only primary-side resonance can achieve contactless power transfer for Level-1 charger (charging power classified below 1.8 kW) applications by RMIC. Due to the broad-band power transfer ability, the LLC charger can deliver a maximum power transfer of about 90% for COR=100%, but as low as 70% for the worst case COR=25%.

Embodiments

1. An LLC charger, comprising:
a transmitter-receiver (TX-RX) transformer including a movable matrix core set (MCS), wherein the MCS separably includes a transmitter-MCS (TX-MCS) and a receiver-MCS (RX-MCS), and charges a battery pack with a non-contact power transmission via a resonant magnetic-induction coupling (RMIC) between the TX-MCS and the RX-MCS;
a transmitter including:
an LLC power stage; and
the TX-MCS electrically connected to the LLC power stage;
a receiver including:
the RX-MCS; and
a rectifier electrically connected to the RX-MCS.

2. The LLC charger according to Embodiment 1, further comprising a filter capacitor electrically connected to the rectifier in parallel, wherein the TX-RX transformer further includes an RMIC area and a core loss, the MCS includes plural sub-TX cores and plural sub-Rx cores, the plural sub-TX cores and the plural sub-RX cores are arranged in respective matrix forms, and the MCS is configured in the TX-RX transformer to relatively increase the RMIC area and decrease the core loss thereof.

3. The LLC charger according to Embodiment 1 or 2, further comprising two output terminals, an input power and an output current, wherein the output current is a charging current, each the sub-TX core and each the sub-RX core are both wound with at least one winding, the rectifier includes plural rectifying devices, all windings of the sub-TX cores are connected to one another in series to distribute the input power to the sub-TX cores, each winding of each the sub-RX core is electrically connected to a corresponding rectifying device, each winding of each the sub-RX core and the corresponding rectifying device are electrically connected to the two output terminals in parallel to distribute the charging current to each the sub-RX core, and either of each the sub-TX core and each the sub-RX core is one selected from a group consisting of an EE core, an EER core and a PQ core.

4. The LLC charger according to anyone of the above-mentioned Embodiments, wherein the TX-RX transformer is suitable for vehicle-mounted charging, and further includes a primary side and a secondary side, the LLC power stage is an LLC converter, the TX-MCS is the primary side, the primary side and the LLC converter are configured in a piece of equipment, the RX-MCS is the secondary side, the secondary side is configured on a vehicle-mounted system and includes each the sub-RX core and each the rectifying device, and when the vehicle-mounted system requires charging and moves toward the equipment, the RX-MCS and the TX-MCS are aligned automatically, and engage in charging via the RMIC.

5. The LLC charger according to anyone of the above-mentioned embodiments, wherein the LLC converter includes a power element, the equipment is configured in one of a fixed position and a non-fixed position, the vehicle-mounted system is one selected from a group consisting of a vehicle, a self-propelled robot, an emergency medical care vehicle, and a wheel chair, the TX-RX transformer further includes plural sub-TX-RX transformers, each the sub-TX-RX transformer has a specific sub-TX core and a corresponding sub-RX core, and each the sub-TX-RX transformer has a turn ratio of $(n_k = N_{pk}/N_{sk}) < 1$, where $n_k$ indicates a turn ratio of the kth sub-TX-RX transformer, $N_{pk}$ is a number of turns of the winding on the specific sub-TX core, $N_{sk}$ is a number of turns of the winding on the specific sub-RX core, and $n_k < 1$ results in a relatively small exciting current on the power element to decrease the core loss.

6. The LLC charger, according to anyone of the above-mentioned embodiments, further comprising a receiving terminal, wherein the battery pack is located on the receiving terminal and has an inner resistance, the LLC converter has a resonant tank and a resonant element, the charging via RMIC only requires a primary side resonance, and is free from a secondary side resonance to engage in the non-contact power transmission and to charge the battery pack, the receiver on the vehicle-mounted system only includes the RX-MCS and the rectifier because the LLC charger can adapt the battery pack into the resonant tank, the inner resistance is reflected to the TX-MCS being the primary side of the TX-RX transformer to serve as a portion of the resonant element, a parasitic capacitance and a leakage inductance generated due to a deviation from one of a parking spot and an installation position of the vehicle-mounted system are totally absorbed into the resonant tank to enable the charging current to be free from a noise interference, even if the deviance is generated, the LLC charger can continuously transmit a power due to the LLC charger has a wide frequency response capability, and although the charging capability will be decreased, the charging will not be interrupted.

7. A charger, comprising:
a transmitter-receiver (TX-RX) transformer including a TX-matrix core set (TX-MCS) and an RX-MCS;
an LLC power stage electrically connected to the TX-MCS; and
a rectifier electrically connected to the RX-MCS so as to charge a battery pack with a non-contact power transmission.

8. A transmitter-receiver (TX-RX) transformer comprising a matrix core set (MCS), wherein the MCS includes:
a TX-MCS; and
an RX-MCS generating a resonant magnetic-induction coupling (RMIC) with the TX-MCS so as to output a contactless power.

9. An LLC charger, comprising:
the TX-RX transformer according to Embodiment 8, wherein the MCS is movable, and charges a battery pack with a non-contact power transmission via the RMIC between the TX-MCS and the RX-MCS;

an LLC power stage electrically connected to the TX-MCS; and
a rectifier electrically connected to the RX-MCS.

10. The LLC charger according to Embodiment 8 or 9 of the above-mentioned embodiments, further comprising a transmitter and a receiver, wherein the transmitter includes the LLC power stage and the TX-MCS, and the receiver includes the RX-MCS and the rectifier.

11. A charger, comprising:
the TX-RX transformer according to Embodiment 8;
an LLC power stage electrically connected to the TX-MCS; and
a rectifier electrically connected to the RX-MCS so as to charge a battery pack with a non-contact power transmission.

12. A controlling method for an LLC charger, wherein the LLC charger is the LLC charger according to Embodiment 1, the LLC charger further includes an output current being a charging current, and the battery pack has an inner resistance, comprising
automatically regulating the charging current according to a state of charge of the battery pack and intersections of characteristic curves under respective circuit quality factors $Q_r$ with a constant-frequency, when the LLC charger operates at the constant-frequency and in a self-regulating control status; and
causing the charging current to decrease so as to achieve a trickle charging mode such that the charging current can be automatically regulated to have a safe charging function, and when the battery pack gradually approaches a full capacity, the inner resistance increases, the circuit quality factor $Q_r$ decreases, and the LLC charger has an operating point changed from a first one of the intersections to a second one of the intersections on a characteristic curve of $Q_r$ of light-load.

13. The controlling method for the LLC charger according to Embodiment 1 or 12, wherein the threshold tracking zone having a minimum value larger than a first conductance derivative ratio, and a maximum value smaller than a second conductance derivative ratio, the Ipv-Vpv curve, the Ppv-Vpv curve and the threshold tracking zone are provided to guide the controller, the method further comprising a step of:
a) causing the controller to use a variable-frequency constant-duty control to engage in an MPPT.

14. The controlling method for the LLC charger according to anyone of the above-mentioned embodiments, wherein the LLC charger further includes two output terminals and an input power, each the sub-TX core and each the sub-RX core are both wound with at least one winding, the rectifier includes plural rectifying devices, all windings of the sub-TX cores are connected to one another in series to distribute the input power to the sub-TX cores, each winding of each the sub-RX core is electrically connected to a corresponding rectifying device, each winding of each the sub-RX core and the corresponding rectifying device are electrically connected to the two output terminals in parallel to distribute the charging current to each the sub-RX core, and either of each the sub-TX core and each the sub-RX core is one selected from a group consisting of an EE core, an EER core and a PQ core.

15. The controlling method for the LLC charger according to anyone of the above-mentioned embodiments, wherein the TX-RX transformer is suitable for vehicle-mounted charging, and further includes a primary side and a secondary side, the LLC power stage is an LLC converter, the TX-MCS is the primary side, the primary side and the LLC converter are configured in a piece of equipment, the RX-MCS is the secondary side, the secondary side is configured on a vehicle-mounted system and includes each the sub-RX core and each the rectifying device, and when the vehicle-mounted system requires charging and moves toward the equipment, the RX-MCS and the TX-MCS are aligned automatically, and engage in charging via the RMIC.

16. The controlling method for the LLC charger according to anyone of the above-mentioned embodiments, wherein the LLC converter includes a power element, the equipment is configured in one of a fixed position and a non-fixed position, the vehicle-mounted system is one selected from a group consisting of a vehicle, a self-propelled robot, an emergency medical care vehicle, and a wheel chair, the TX-RX transformer further includes plural sub-TX-RX transformers, each the sub-TX-RX transformer has a specific sub-TX core and a corresponding sub-RX core, and each the sub-TX-RX transformer has a turn ratio of $(n_k = N_{pk}/N_{sk}) < 1$, where $n_k$ indicates a turn ratio of the kth sub-TX-RX transformer, $N_{pk}$ is a number of turns of the winding of the specific sub-TX core, $N_{sk}$ is a number of turns of the winding of the specific sub-RX core, and $n_k < 1$ results in a relatively small exciting current on the power element to decrease the core loss.

17. The controlling method for the LLC charger according to anyone of the above-mentioned embodiments, wherein the LLC charger further includes a receiving terminal, the battery pack is located on the receiving terminal, the LLC converter has a resonant tank and a resonant element, the charging via RMIC requires a primary side resonance to engage in the non-contact power transmission and to charge the battery pack, the inner resistance is reflected to the TX-MCS being the primary side of the TX-RX transformer to serve as a portion of the resonant element, a parasitic capacitance and a leakage inductance generated due to a deviation from one of a parking spot and an installation position of the vehicle-mounted system are totally absorbed into the resonant tank to enable the charging current to be free from a noise interference.

18. A controlling method for an LLC charger, wherein the LLC charger is the LLC charger according to Embodiment 1, the LLC charger further includes an output current being a charging current, and the battery pack has an inner resistance, comprising
selecting a specific operating frequency for the LLC charger corresponding to a characteristic curve of a given circuit quality factor $Q_r$ so as to output a value of the charging current when the LLC charger operates under a variable-frequency control mode; and
causing the LLC charger to automatically regulate the operating frequency according to a state of charge (SOC) of the battery pack on the characteristic curve of the $Q_r$ so as to maintain the charging current as a constant current, wherein when the SOC of the battery pack increases, the inner resistance increases, the circuit quality factor $Q_r$ decreases, and the LLC charger regulates the operating frequency so as to move an operation point of the LLC charger to a match $Q_r$-given characteristic curve of a relatively heavy load, and to prevent the charging current from decreasing to be maintained at the constant current to achieve a constant current charging mode.

According to the descriptions above, the present invention discloses an LLC charger including a transmitter-receiver (TX-RX) transformer having a removable and separable matrix core set (MCS) and a controlling method thereof, and the goal of the MCS in the TX-RX transformer is to relatively increase a resonant magnetic-induction coupling (RMIC) area and relatively decrease a core loss, which is both non-obvious and novel.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An LLC charger, comprising:
   a transmitter-receiver (TX-RX) transformer including a movable matrix core set (MCS), wherein the MCS separably includes a transmitter-MCS (TX-MCS) with plural sub-TX cores and a receiver-MCS (RX-MCS) with plural sub-RX cores, and charges a battery pack with a non-contact power transmission via a resonant magnetic-induction coupling (RMIC) between the TX-MCS and the RX-MCS, all the sub-TX cores are connected to one another in series, and all the sub-RX cores are connected to one another in parallel;
   a transmitter including:
      an LLC (inductor, inductor, capacitor) power stage; and
      the TX-MCS electrically connected to the LLC power stage;
   a receiver including:
      the RX-MCS; and
   a rectifier electrically connected to the RX-MCS.

2. The LLC charger according to claim 1, further comprising a filter capacitor electrically connected to the rectifier in parallel, wherein the TX-RX transformer further includes an RMIC area and a core loss, the plural sub-TX cores and the plural sub-RX cores are arranged in respective matrix forms, and the MCS is configured in the TX-RX transformer to relatively increase the RMIC area and decrease the core loss thereof.

3. The LLC charger according to claim 2, further comprising two output terminals, an input power and an output current, wherein the output current is a charging current, each the sub-TX core and each the sub-RX core are both wound with at least one winding, the rectifier includes plural rectifying devices, all windings of the sub-TX cores are connected to one another in series to distribute the input power to the sub-TX cores, two windings of each the sub-RX core are electrically connected through a corresponding rectifying device, each rectifying device has two output terminals, all the output terminals from each the sub-RX core are electrically connected in parallel to the two output terminals being the summing points of a total output charging current collected from each the sub-RX core, and all the sub-TX cores and all the sub-RX cores are selected from a group consisting of an EE ("E" pattern) core, an EER ("E" pattern with round center legs) core and a PQ (Power and Quality) core.

4. The LLC charger according to claim 3, wherein the TX-RX transformer is suitable for vehicle-mounted charging, and further includes a primary side and a secondary side, the LLC power stage is an LLC converter, the TX-MCS is the primary side, the primary side and the LLC converter are configured in a piece of equipment, the RX-MCS is the secondary side, the secondary side is configured on a vehicle-mounted system and includes each the sub-RX core and each the rectifying device, and when the vehicle-mounted system requires charging and moves toward the equipment, the RX-MCS and the TX-MCS are aligned automatically, and engage in charging via the RMIC.

5. The LLC charger according to claim 4, wherein the LLC converter includes a power element, the equipment is configured in one of a fixed position and a non-fixed position, the vehicle-mounted system is one selected from a group consisting of a vehicle, a self-propelled robot, an emergency medical care vehicle, and a wheel chair, the TX-RX transformer further includes plural sub-TX-RX transformers, each the sub-TX-RX transformer has a specific sub-TX core and a corresponding sub-RX core, and each the sub-TX-RX transformer has a turn ratio of (nk=Npk/Nsk)<1, where nk indicates a turn ratio of the kth sub-TX-RX transformer, Npk is a number of turns of the winding on the specific sub-TX core, Nsk is a number of turns of the winding on the specific sub-RX core, and nk<1 results in a relatively small exciting current on the power element to decrease the core loss.

6. The LLC charger according to claim 4, further comprising a receiving terminal, wherein the battery pack is located on the receiving terminal and has an inner resistance, the LLC converter has a resonant tank and a resonant element, the charging via RMIC only requires a primary side resonance, and is free from a secondary side resonance to engage in the non-contact power transmission and to charge the battery pack, the receiver on the vehicle-mounted system only includes the RX-MCS and the rectifier because the LLC charger can adapt the battery pack into the resonant tank, the inner resistance is reflected to the TX-MCS being the primary side of the TX-RX transformer to serve as a portion of the resonant element, a parasitic capacitance and a leakage inductance generated due to a deviation from one of a parking spot and an installation position of the vehicle-mounted system are totally absorbed into the resonant tank to enable the charging current to be free from a noise interference, even if the deviance is generated, the LLC charger can continuously transmit a power due to the LLC charger having a wide frequency response capability, and although the charging capability will be decreased, the charging will not be interrupted.

7. A controlling method for an LLC charger, wherein the LLC charger is the LLC charger as claimed in claim 1, the LLC charger further includes an output current being a charging current, and the battery pack has an inner resistance, comprising
   automatically regulating the charging current according to a state of charge of the battery pack and intersections of characteristic curves under respective circuit quality factors Qr with a constant-frequency, when the LLC charger operates at the constant-frequency and in a self-regulating control status; and
   causing the charging current to decrease so as to achieve a trickle charging mode such that the charging current can be automatically regulated to have a safe charging function, and when the battery pack gradually approaches a full capacity, the inner resistance increases, the circuit quality factor Qr decreases, and the LLC charger has an operating point changed from a first one of the intersections to a second one of the intersections on a characteristic curve of Qr of light-load.

8. The controlling method for the LLC charger according to claim 7, wherein the LLC charger further includes a filter capacitor electrically connected to the rectifier in parallel, the TX-RX transformer further includes an RMIC area and a core loss, the plural sub-TX cores and the plural sub-RX cores are arranged in respective matrices, and the MCS is configured in the TX-RX transformer to relatively increase the RMIC area and decrease the core loss.

9. The controlling method for the LLC charger according to claim 8, wherein the LLC charger further includes two output terminals and an input power, each the sub-TX core and each the sub-RX core are both wound with at least one winding, the rectifier includes plural rectifying devices, all windings of the sub-TX cores are connected to one another in series to distribute the input power to the sub-TX cores, each winding of each the sub-RX core is electrically connected to a corresponding rectifying device, each winding of each the sub-RX core and the corresponding rectifying device are electrically connected to the two output terminals in parallel to distribute the charging current to each the sub-RX core, and either of each the sub-TX core and each the sub-RX core is one selected from a group consisting of an EE ("E" pattern) core, an EER ("E" pattern with round center legs) core and a PQ (Power and Quality) core.

10. The controlling method for the LLC charger according to claim 9, wherein the TX-RX transformer is suitable for vehicle-mounted charging, and further includes a primary side and a secondary side, the LLC power stage is an LLC converter, the TX-MCS is the primary side, the primary side and the LLC converter are configured in a piece of equipment, the RX-MCS is the secondary side, the secondary side is configured on a vehicle-mounted system and includes each the sub-RX core and each the rectifying device, and when the vehicle-mounted system requires charging and moves toward the equipment, the RX-MCS and the TX-MCS are aligned automatically, and engage in charging via the RMIC.

11. The controlling method for the LLC charger according to claim 10, wherein the LLC converter includes a power element, the equipment is configured in one of a fixed position and a non-fixed position, the vehicle-mounted system is one selected from a group consisting of a vehicle, a self-propelled robot, an emergency medical care vehicle, and a wheel chair, the TX-RX transformer further includes plural sub-TX-RX transformers, each the sub-TX-RX transformer has a specific sub-TX core and a corresponding sub-RX core, and each the sub-TX-RX transformer has a turn ratio of (nk=Npk/Nsk)<1, where nk indicates a turn ratio of the kth sub-TX-RX transformer, Npk is a number of turns of the winding of the specific sub-TX core, Nsk is a number of turns of the winding of the specific sub-RX core, and nk<1 results in a relatively small exciting current on the power element to decrease the core loss.

12. The controlling method for the LLC charger according to claim 11, wherein the LLC charger further includes a receiving terminal, the battery pack is located on the receiving terminal, the LLC converter has a resonant tank and a resonant element, the charging via RMIC requires a primary side resonance to engage in the non-contact power transmission and to charge the battery pack, the inner resistance is reflected to the TX-MCS being the primary side of the TX-RX transformer to serve as a portion of the resonant element, a parasitic capacitance and a leakage inductance generated due to a deviation from one of a parking spot and an installation position of the vehicle-mounted system are totally absorbed into the resonant tank to enable the charging current to be free from a noise interference.

13. A controlling method for an LLC charger, wherein the LLC charger is the LLC charger as claimed in claim 1, the LLC charger further includes an output current being a charging current, and the battery pack has an inner resistance, comprising
selecting a specific operating frequency for the LLC charger corresponding to a characteristic curve of a given circuit quality factor Qr so as to output a value of the charging current when the LLC charger operates under a variable-frequency control mode; and causing the LLC charger to automatically regulate the operating frequency according to a state of charge (SOC) of the battery pack on the characteristic curve of the Qr so as to maintain the charging current as a constant current, wherein when the SOC of the battery pack increases, the inner resistance increases, the circuit quality factor Qr decreases, and the LLC charger regulates the operating frequency so as to move an operation point of the LLC charger to a match Qr-given characteristic curve of a relatively heavy load, and to prevent the charging current from decreasing to be maintained at the constant current to achieve a constant current charging mode.

14. A charger, comprising:
a transmitter-receiver (TX-RX) transformer including a matrix core set (MCS) separably having a TX-matrix core set (TX-MCS) with plural sub-TX cores and an RX-matrix core set (RX-MCS) with plural sub-RX cores, wherein all the sub-TX cores are connected to one another in series, and all the sub-RX cores are connected to one another in parallel;
an LLC (inductor, inductor, capacitor) power stage electrically connected to the TX-MCS; and
a rectifier electrically connected to the RX-MCS so as to charge a battery pack with a non-contact power transmission.

15. A transmitter-receiver (TX-RX) transformer comprising a matrix core set (MCS), wherein the MCS separably includes:
a transmitter matrix core set (TX-MCS) having plural sub-TX cores; and
a receiver matrix core set (RX-MCS) having plural sub-RX cores and generating a resonant magnetic-induction coupling (RMIC) with the TX-MCS so as to output a contactless power, wherein all the sub-TX cores are connected to one another in series, and all the sub-RX cores are connected to one another in parallel.

16. An LLC charger, comprising:
the transmitter-receiver (TX-RX) transformer as claimed in claim 15, wherein the MCS is movable, and charges a battery pack with a non-contact power transmission via the RMIC between the TX-MCS and the RX-MCS;
an LLC (inductor, inductor, capacitor) power stage electrically connected to the TX-MCS; and
a rectifier electrically connected to the RX-MCS.

17. The LLC charger according to claim 16, further comprising a transmitter and a receiver, wherein the transmitter includes the LLC power stage and the TX-MCS, and the receiver includes the RX-MCS and the rectifier.

18. A charger, comprising:
the transmitter-receiver (TX-RX) transformer as claimed in claim 15;
an LLC power stage electrically connected to the TX-MCS; and
a rectifier electrically connected to the RX-MCS so as to charge a battery pack with a non-contact power transmission.

* * * * *